US012035740B2

(12) United States Patent
Brooks et al.

(10) Patent No.: US 12,035,740 B2
(45) Date of Patent: Jul. 16, 2024

(54) PREDICTIVE DEMAND-BASED PRODUCE RIPENING SYSTEM

(71) Applicant: Walmart Apollo, LLC, Bentonville, AR (US)

(72) Inventors: Cristy Crane Brooks, Cassville, MO (US); David Blair Brightwell, Bentonville, AR (US); Greg Bryan, Bentonville, AR (US); Jesse Lee Eaton, Springdale, AR (US); Jeffrey Kerbs, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 1194 days.

(21) Appl. No.: 16/449,301

(22) Filed: Jun. 21, 2019

(65) Prior Publication Data

US 2020/0005230 A1  Jan. 2, 2020

Related U.S. Application Data

(60) Provisional application No. 62/691,589, filed on Jun. 28, 2018.

(51) Int. Cl.
| | |
|---|---|
| *A23N 15/06* | (2006.01) |
| *A23B 7/00* | (2006.01) |
| *A23B 7/14* | (2006.01) |
| *A23B 7/152* | (2006.01) |
| *G06F 18/21* | (2023.01) |
| *G06Q 10/04* | (2023.01) |

(Continued)

(52) U.S. Cl.
CPC .............. *A23N 15/06* (2013.01); *A23B 7/152* (2013.01); *G06F 18/217* (2023.01); *G06Q 10/04* (2013.01);
(Continued)

(58) Field of Classification Search
CPC .. A23B 7/152; A23B 7/00; A23B 7/14; G06Q 10/04; G06Q 10/06315;
(Continued)

(56) References Cited

U.S. PATENT DOCUMENTS

| | | | |
|---|---|---|---|
| 3,951,610 A | 4/1976 | Freebairn et al. | |
| 4,764,389 A | * 8/1988 | LaBarge | A23B 7/152 |
| | | | 99/468 |

(Continued)

FOREIGN PATENT DOCUMENTS

| | | |
|---|---|---|
| WO | 1995000030 A1 | 1/1995 |
| WO | 2014144788 A1 | 9/2014 |

OTHER PUBLICATIONS

Xu, G. et al., "Demand Forecasting of Agricultural Products Logistics in Community", American Journal of Industrial and Business Management, Jul. 30, 2015, 11 pages, vol. 5, published online Jul. 2015 in SciRes.

(Continued)

*Primary Examiner* — Subbalakshmi Prakash
(74) *Attorney, Agent, or Firm* — Foley IP Law, PLLC

(57) ABSTRACT

Examples provide a fruit ripening rack having a plurality of chambers for on-site produce ripening at a retail location. A controller component generates predicted demand for ripened fruit on a selected date at a selected location based on transaction history data and/or seasonal demand. The controller component calculates the quantity of fruit based on the predicted demand. The controller component determines conditions within each chamber to accelerate ripening of the calculated quantity of one or more types of fruit to one or more selected levels of ripeness on the selected date. The conditions include amount of ethylene gas in each chamber, length of exposure to the ethylene gas, temperature inside the chamber and/or humidity level inside the chamber. The fruit ripening rack controls internal conditions within each chamber to provide variable fruit ripening in accordance with per-chamber configurations to satisfy predicted daily demand at the selected location.

18 Claims, 15 Drawing Sheets

(51) Int. Cl.
*G06Q 10/0631* (2023.01)
*G06Q 10/083* (2023.01)
*G06Q 10/0832* (2023.01)
*G06Q 10/087* (2023.01)
*G06Q 30/0202* (2023.01)

(52) U.S. Cl.
CPC ... *G06Q 10/06315* (2013.01); *G06Q 10/0832* (2013.01); *G06Q 10/0838* (2013.01); *G06Q 10/087* (2013.01); *G06Q 30/0202* (2013.01); *A23B 7/00* (2013.01); *A23B 7/14* (2013.01); *Y10S 47/00* (2013.01)

(58) Field of Classification Search
CPC .......... G06Q 30/0202; G06Q 10/0832; G06Q 10/087; G06Q 10/0838; G06K 9/6262; A23N 15/06; G01N 9/00
USPC ................ 47/57; 99/468, 467; 426/419, 312
See application file for complete search history.

(56) References Cited

U.S. PATENT DOCUMENTS

| | | | |
|---|---|---|---|
| 5,028,443 A | 7/1991 | Wade | |
| 5,789,007 A | 8/1998 | Bianco | |
| 7,455,225 B1 | 11/2008 | Hadfield et al. | |
| 9,121,840 B2 | 9/2015 | Minvielle | |
| 2005/0217282 A1 | 10/2005 | Strohm et al. | |
| 2009/0226584 A1 | 9/2009 | Chiang et al. | |
| 2013/0013099 A1 | 1/2013 | Delele et al. | |
| 2016/0198730 A1 | 7/2016 | Garratt et al. | |
| 2017/0325427 A1 | 11/2017 | Straight et al. | |

OTHER PUBLICATIONS

Janssen S. et al., "Ethylene Detection in Fruit Supply Chains", Philosophical Transactions, 2014, 21 pages, of the Royal Society, rsta.royalsocietypublishing.org.

Thomas S., "International Search Report", International Application No. PCT/US2019/038604, mailed Aug. 28, 2019, 3 pages.

Thomas S., "Written Opinion of the International Searching Authority", International Application No. PCT/US2019/038604, mailed Aug. 28, 2019, 14 pages.

Unknown, "Banana Ripening Manifold", http://www.jkdivingequipment.in/banana-ripening-manifold.html, J K Subsea Engineering Private Limited.

Unknown, "Ethylene Ripening Chamber", http://venkateswaragas.in/productsearch/ethylene-ripening-chamber/P9, Sri Venkateswara Carbonic Gases Pvt. Ltd.

* cited by examiner

1100 — 1102 1104 1106 1108 1110 1112 1114

Pulp Temperatures °F

|  | 1 | 2 | 3 | 4 | 5 | 6 | 7 | 8 |
|---|---|---|---|---|---|---|---|---|
| 1202 4 Day Schedule | 64° | 64° | 62° | 60° | | | | |
| 1204 5 Day Schedule | 62° | 62° | 62° | 62° | 60° | | | |
| 1206 6 Day Schedule | 62° | 62° | 60° | 60° | 60° | 58° | | |
| 1208 7 Day Schedule | 60° | 60° | 60° | 60° | 60° | 58° | 58° | |
| 1210 8 Day Schedule | 58° | 58° | 58° | 58° | 58° | 58° | 58° | 58° |

Day

PREDICTIVE DEMAND-BASED PRODUCE RIPENING SYSTEM

BACKGROUND

Many types of produce are harvested and distributed in a mature but un-ripe state while the fruit is still green. The produce is exposed to ethylene gas to initiate ripening at a point in the supply chain prior to shipment or delivery to a market or store for consumption. During this process, containers of un-ripe produce are exposed to ethylene gas sufficient to at least partially ripen the fruit upon arrival at the market or store. Once ripening begins, the fruit continues to ripen which frequently results in some quantity of fruit wasted due to continued ripening prior to purchase by consumers. Moreover, retail stores ordering crates of pre-ripe produce may obtain insufficient quantities of ripened fruit resulting in a deficit of fruit available or obtain too many cases of fruit resulting in waste/over-ripening of fruit prior to sale. This is an inaccurate, wasteful and inefficient process.

SUMMARY

Some examples provide a system for dynamic customization of fruit ripening. A fruit ripening rack includes two or more chambers configured to store at least one crate of unripe fruit. The fruit ripening rack includes a first chamber and a second chamber. A set of ethylene gas supply lines connect an ethylene gas metering device to the plurality of chambers. A control device including a memory and a processor communicatively coupled to the memory. An analysis component analyzes historical transaction data and seasonal demand data using pattern recognition. The analysis component generates a first predicted demand for a selected type of fruit on a first selected date and a second predicted demand for the selected type of fruit on a second selected date. A prediction component calculates a first quantity of fruit to satisfy the predicted demand on the first selected date based on the analysis results. The prediction component calculates a second quantity of fruit to satisfy the predicted demand on the second selected date based on the analysis results. A calculation component calculates a first quantity of ethylene gas and a first exposure time to complete ripening of the first quantity of fruit in the first chamber to a selected level of ripeness on the first selected date. The calculation component calculates a second quantity of ethylene gas and a second exposure time to complete ripening of the second quantity of fruit in the second chamber to the selected level of ripeness on the second selected date. Sensor data is generated by a set of sensor devices. If the sensor data indicates the first quantity of fruit is present within the first chamber, a controller component activates the ethylene gas metering device to release the first quantity of ethylene gas into the first chamber for the first exposure time. If the sensor data indicates the second quantity of fruit is present within the second chamber, the controller component activates the ethylene gas metering device to release the second quantity of ethylene gas into the second chamber for the second exposure time.

Other examples provide a computer-implemented method for customized fruit ripening. An analysis component analyzes historical transaction data associated with a selected location and seasonal demand data associated with the selected location using pattern recognition to generate a first predicted demand for a selected type of fruit on a first selected date. The analysis component generates a second predicted demand for the selected type of fruit on a second selected date at the selected location based on the analysis results. A predication component calculates a first quantity of fruit to satisfy the first predicted demand on the first selected date. The prediction component calculates a second quantity of fruit to satisfy the second predicted demand on the second selected date. A notification component sends an instruction to at least one user to load the first quantity of unripe fruit into a first chamber of a fruit ripening rack and load the second quantity of the fruit into a second chamber of the fruit ripening rack. A calculation component calculates a first quantity of ethylene gas and a first exposure time to complete ripening of the first quantity of fruit in the first chamber to a selected level of ripeness on the first selected date. The calculation component calculates a second quantity of ethylene gas and a second exposure time to complete ripening of the second quantity of fruit in the second chamber to the selected level of ripeness on the second selected date. A metering device releases the first quantity of ethylene gas into the first chamber for the first exposure time. The metering device releases the second quantity of ethylene gas into the second chamber for the second exposure time.

Still other examples provide a customized fruit ripening rack. The fruit ripening rack includes a set of air-tight chambers for storing at least one case of unripe fruit. A case of unripe fruit includes fruit unexposed to ethylene gas. The set of chambers includes a first chamber and a second chamber. A set of ethylene gas supply lines connects an ethylene gas metering device to the set of chambers. A control device includes a memory and at least one processor communicatively coupled to the memory. A user interface device includes a set of configuration controls. The user interface device receives a set of per-chamber fruit ripening configurations for customized ripening of fruit in each chamber via the set of configuration controls. The set of per-chamber fruit ripening configurations includes a per-chamber level of ripeness and a per-chamber date of completion. A set of sensor devices associated with each chamber in the set of chambers generates sensor data associated with contents of each chamber. An analysis component analyzes the sensor data to identify a first quantity of fruit in a first chamber and a second quantity of fruit in a second chamber in the set of chambers. A calculation component calculates a first quantity of ethylene gas and a first exposure time to complete ripening of the first quantity of fruit in the first chamber to a selected level of ripeness on the first selected date. The calculation component calculates a second quantity of ethylene gas and a second exposure time to complete ripening of the second quantity of fruit in the second chamber to the selected level of ripeness on the second selected date. A controller component activates the ethylene gas metering device. The ethylene gas metering device releases the first quantity of ethylene gas into the first chamber for the first exposure time and release the second quantity of ethylene gas into the second chamber for the second exposure time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable a device for ripening customized quantities of fruit to a selected level of ripeness within a retail store based on predicted daily demand for the fruit. The predicted daily demand for the retail store in some examples is calculated based on previous sales/transaction history, local events, seasonal data, etc. This enables the system to provide customized quantities of fruit ripened to a desired level of ripeness each day at a per-store level to reduce food waste due to over-ripening prior to sale.

The fruit ripening rack in other examples include a metering device which controls quantities of ethylene gas released into each chamber in a plurality of air-tight fruit ripening chambers. This enables different quantities of ethylene gas to be released into each chamber to ripen fruit at variable rates. The metering device further enables fruit ripening in each chamber to be completed on different dates and/or different times to produce variable quantities of fruit ripened to different levels of ripeness. Thus, the fruit ripening rack can ripen bananas in a first chamber such that the bananas will be completely ripe (totally yellow) within two days while fruit within a second chamber will only be ripened to a partially ripened state (half yellow and half green) on the second date (variable ripening rates) to ensure sufficient quantities of ripe fruit for each day while preventing/minimizing over-ripening.

Figure 1:
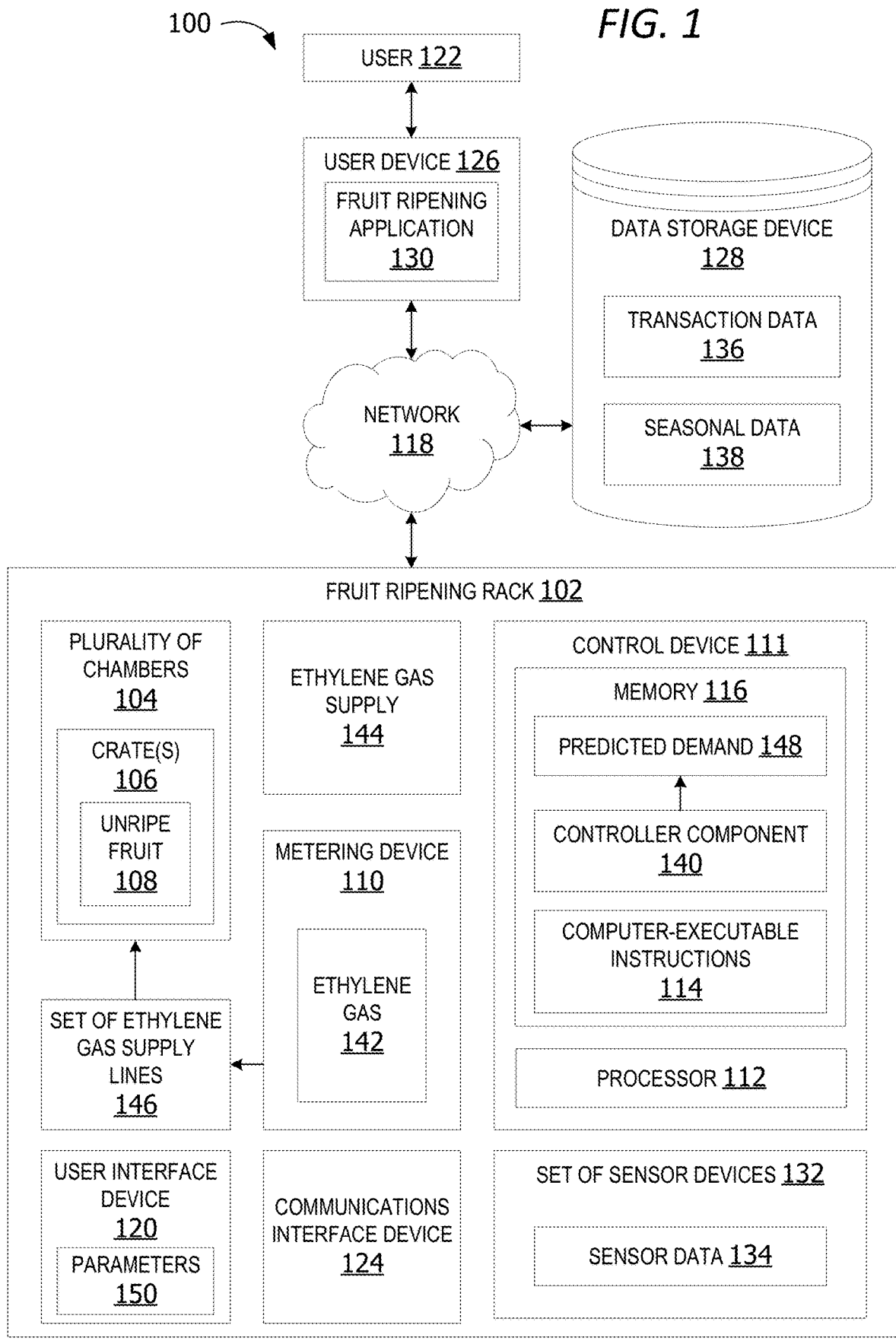
FIG. 1 is an exemplary block diagram illustrating a system for customizing produce ripening on a per-store basis based on per-day predicted demand for the produce.

Referring again to FIG. 1, an exemplary block diagram illustrates a system 100 for customizing produce ripening on a per-store basis based on per-day predicted demand for the produce. In the example of FIG. 1, the fruit ripening rack 102 represents a plurality of chambers 104 configured to store or contain one or more crates 106 of unripe fruit 108. An ethylene gas metering device 110 delivers ethylene gas ($C_2H_4$) into each chamber to accelerate ripening of fruit in each chamber at variable rates for completion of ripening to a selected level of ripeness on different days of the week. The fruit ripening rack can be utilized to ripen fruit, such as, but not limited to, bananas, avocadoes, mangoes, apples, papaya, tomatoes and/or any other type of mature but unripe fruit which can be ripened via exposure to ethylene gas.

The unripe fruit 108 is fruit which has never been exposed to ethylene gas. The unripe fruit 108 is completely unripe or only partially ripe (ripening is incomplete) such that the fruit is unsuitable for consumption in its current unripe/partially ripe state.

The fruit ripening rack 102 can include a control device 111. The control device 111 includes a processor 112 and a memory 116. The processor 112 executes computer-executable instructions 114 (e.g., as application programs, operating system functionality, or both) to implement the operations and functionality associated with the fruit ripening rack 102.

The processor 112 includes any quantity of processing units and is programmed to execute the computer-executable instructions 114. The computer-executable instructions 114 can be performed by the processor 112 or by multiple processors within the fruit ripening rack 102 or performed by a processor external to the fruit ripening rack 102. The processor 112 can represent a single processor, a group of processing units or other computing devices. In some examples, the processor 112 is programmed to execute instructions such as those illustrated in the figures (e.g., FIG. 1).

The fruit ripening rack 102 optionally includes one or more computer-readable media such as the memory 116. The memory 116 includes any quantity of media associated with or accessible by the fruit ripening rack 102. The memory 116 can be internal to the fruit ripening rack 102 (as shown in FIG. 1), external to the fruit ripening device (not shown), or both (not shown). In some examples, the memory 116 includes read-only memory and/or memory wired into the fruit ripening rack 102.

The memory 116 stores data, such as one or more applications. The applications, when executed by the processor 112, operate to perform functionality on the fruit ripening rack 102. The applications can communicate with counterpart applications or services such as web services accessible via a network 118. For example, the applications can represent downloaded client-side applications that correspond to server-side services executing in a cloud.

In other examples, the fruit ripening rack 102 includes a user interface device 120. The user interface device 120 includes a graphics card for displaying data to a user 122 operating the fruit ripening rack 102. The graphics card can also receive data from the user 122. The user interface device 120 can also include computer-executable instructions (e.g., a driver) for operating the graphics card. Further, the user interface device 120 can include a display (e.g., a touch screen display, projected display and/or natural user interface) and/or computer-executable instructions (e.g., a driver) for operating the display. The user interface device 120 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. For example, the user can enter fruit ripening configuration settings verbally (audio input), textually (text input) and/or kinesthetically (haptic input).

The network 118 is implemented by one or more physical network components, such as, but without limitation, routers, switches, network interface cards (NICs), and other network devices. The network 118 can be any type of network for enabling communications with remote computing devices, such as, but not limited to, a local area network (LAN), a subnet, a wide area network (WAN), a wireless (Wi-Fi) network, or any other type of network. In this example, the network 118 is a WAN, such as the Internet. However, in other examples, the network 118 is a local or private LAN.

In some examples, the system 100 optionally includes a communications interface component 124. The communications interface component 124 includes a network interface card and/or computer-executable instructions (e.g., a driver) for operating the network interface card. Communication between the fruit ripening rack 102 and other devices, such as but not limited to a user device 126 and/or a remote data storage device 128, can occur using any protocol or mechanism over any wired or wireless connection. In some examples, the communications interface component 124 is operable with short range communication technologies such as by using near-field communication (NFC) tags.

The user device 126 represents any computing device executing computer-executable instructions. The user device 126 can be implemented as a mobile computing device, such as, but not limited to, a wearable computing device, a mobile telephone, laptop, tablet, computing pad, netbook, gaming device, and/or any other portable device. The user device 126 includes at least one processor and a memory for executing applications, such as, but not limited to, a fruit ripening application 130. The fruit ripening application 130 is an application for remotely controlling the fruit ripening rack 102 via the Internet of Things (IoT). The user 122 can select fruit ripening configurations for each of the chambers in the plurality of chambers 104. The configurations can include a level of ripeness for fruit in a selected chamber, a selected date for completion of ripening of the fruit in the selected chamber, and/or quantity of fruit in each chamber.

The user-selected date of completion is the date and/or time at which a given type of fruit in a selected chamber is scheduled to be ripened to a selected level of ripeness. The level of ripeness indicates magnitude of ripeness. For example, a banana can be completely green, half green and half yellow, mostly yellow with green tips, completely yellow with no green, yellow with brown speckling, etc. The type of fruit identifies kind. The type of fruit can include a banana, mango, avocado, or any other type of fruit which is ripened via ethylene gas exposure.

In one example, if the user 122 selects a date of completion in four days for bananas having a level of ripeness in which the banana is yellow with green tips, the controller component calculates the amount of ethylene gas, time of exposure, temperature and/or humidity level which will accelerate ripening of the banana to the desired level of ripeness on the fourth day after initial placement of the fruit into the fruit ripening device. In this example, the user 122 selects a level of ripeness for fruit such that the fruit is ready for sale/placement on a sales floor display on the date of completion. The quantity of fruit is a quantity sufficient to meet predicted demand (predicted sales for that type of fruit) on the date of completion.

In some non-limiting examples, a user selects a different level of ripeness for fruit in different chambers having the same selected date of completion. In these examples, bananas in a first chamber are ripened to a first level of ripeness (partially green and partially yellow) on a first day while fruit in a second chamber are ripened to a second level of ripeness (mostly yellow with green tips) on the first day. Likewise, fruit in the third chamber in this non-limiting example is fully ripened (completely yellow with no green) on the first day.

In this manner, quantities of bananas having varying states of ripeness are made ready for sale on the same day to satisfy the varying tastes/preferences of customers. In other words, some customers prefer to purchase fully ripe bananas while other customers can prefer firmer bananas with more green that will last longer before becoming over-ripe. The fruit ripening rack 102 enables a store to ripen fruit on-site to variable levels of ripeness for sale on the same day to satisfy a wide range of customer preferences while only ripening quantities of fruit expected to be sold on that same day.

In the examples above, the date of completion is set by the user prior to beginning ripening of fruit in a chamber. In other examples, the user dynamically changes the date of completion after ripening has already begun. For example, if unripe fruit is placed into the fruit ripening device on a Monday and the user set the date of completion for Friday (four days later) and the next day changes/resets the date of completion to Thursday (one day early) due to a predicted increase in demand, the system automatically recalculates an updated temperature, humidity and/or ethylene gas exposure time to accelerate ripening of the fruit to ensure the fruit reaches the desired level of ripeness one day earlier (on Thursday instead of Friday).

In still another example, if the fruit placed into the fruit ripening rack 102 is partially ripe (ripening has begun) but not fully ripe to the desired level of ripeness (too green for sale) and the user sets a ripening completion date for the next day, the controller component analyzes sensor data 134 received from a set of sensor devices 132 associated with one or more of the chambers to determine the current level of ripeness of the fruit. The system can also query the user 122 to provide the current level of ripeness via the fruit ripening application 130 or the user interface device 120.

The set of sensor devices 132 includes one or more sensor devices. The set of sensor devices 132 can include a set of one or more image capture devices, a set of one or more temperature sensors, a set of one or more humidity sensors, a set of one or more weight sensors, a set of one or more pressure sensors, a set of one or more ethylene gas detectors, or any other type of sensors. An image capture device can include a camera or an infrared (IR) sensor. A humidity sensor in the set of humidity sensors in some examples is implemented as a hygrometer.

The system utilizes the current level of ripeness for the partially ripe fruit and the user-selected date of completion of ripeness to a desired level of ripeness to calculate temperature and/or humidity levels for the ripening chamber to accelerate ripening to the desired level of ripeness within the twenty-four-hour ripening time selected by the user 122. The system 100 can also release additional ethylene gas into the chamber to accelerate ripening to the desired level within the user-selected ripening time. The ripening time is the time between initial placement of the fruit into the chamber/beginning of the accelerated ripening process/initial exposure of the fruit to ethylene gas and the desired date of completion for ripening to the desired level of ripeness.

In some examples, the user 122 selects fruit ripening configurations for each chamber via the user interface component associated with the user device 126. The fruit ripening configurations includes the user-selected date of completion, desired level of ripeness, type of fruit, etc. In one non-limiting example, the user 122 utilizes the fruit ripening application 130 to control fruit ripening in each chamber. The user utilizes the user interface component to provide the user-selected fruit ripening configurations for each chamber. In other words, each chamber can have a different level of ripeness, a different date of completion, a different type of fruit, or any other type of settings selected on a per-chamber basis. For example, a first chamber can contain bananas set to a completion date in two days while a second chamber contains mangoes having a completion date in three days. Even if both chambers are set to the same level of ripeness, the chambers can utilize different temperature, different humidity and/or different duration of ripening to achieve the selected level of ripeness for the different types of fruit to be completed on the different dates of completion.

The system 100 can optionally include a data storage device 128 for storing data, such as, but not limited to transaction data 136 and/or seasonal data 138. The transaction data 136 includes historical transaction data for produce associated with the selected location and/or similar locations. The selected location is a retail location, such as, but not limited to, a grocery store. The transaction data can include amounts of each type of fruit sold on previous days, previous weeks, previous months, or previous years.

Seasonal data 138 is data associated with seasonal sales of fruit during various seasons/times of the year. Seasonal data 138 can include types of fruit/produce frequently utilized during holidays, events and/or celebrations typically observed at various times of the year. For example, seasonal data 138 can indicate that demand for pumpkins typically increases in October while demand for bananas remains constant throughout the year.

The data storage device 128 can include one or more different types of data storage devices, such as, for example, one or more rotating disks drives, one or more solid state drives (SSDs), and/or any other type of data storage device. The data storage device 128 in some non-limiting examples includes a redundant array of independent disks (RAID) array. In other examples, the data storage device 128 includes a database.

The data storage device 128 in this example is accessed via the network 118, such as a remote data storage device, a data storage in a remote data center, or a cloud storage. In other examples, the data storage device 128 is included within the fruit ripening rack 102 or the user device 126.

The memory 116 in some examples stores one or more computer-executable components. Exemplary components include a controller component 140. The controller component 140 activates the ethylene gas metering device 110 to release a first quantity of ethylene gas 142 from an ethylene gas supply 144 into each chamber of the fruit ripening rack 102 via a set of ethylene gas supply lines 146.

The ethylene gas supply 144 is a source of ethylene gas. The ethylene gas supply 144 can include a multi-user ethylene gas cartridge storing ethylene gas. The ethylene gas cartridge connects to a port or aperture on the ethylene gas metering device 110. The metering device routes ethylene gas from the ethylene gas supply 144 to the correct chamber via a supply line in the set of ethylene gas supply lines 146 connecting the metering device to the selected chamber. In other words, each chamber in the plurality of chambers 104 is connected to the ethylene gas supply 144 via an ethylene gas supply line in the set of ethylene gas supply lines 146. The metering device routes ethylene gas to each chamber via the ethylene gas supply line connected to each chamber. To stop the flow of ethylene gas to a selected chamber, the metering device closes a port or aperture associated with one end of the ethylene gas supply line to stop ethylene gas from flowing through the ethylene gas supply line to the selected chamber.

In one example, the metering device releases a first quantity of ethylene gas 142 into a first chamber at a first temperature to accelerate ripening of the fruit in the first chamber to the user-selected level of ripeness on a first completion date. The controller component 140 activates the ethylene gas metering device 110 to release a second quantity of ethylene gas 142 into a second chamber at a second temperature calculated to accelerate ripening of fruit in the second chamber to the selected level of ripeness on the second completion date.

In some non-limiting examples, the controller component 140 utilizes the transaction data 136 and/or seasonal data 138 to calculates a predicted demand 148 for one or more types of fruit on one or more selected dates. The controller component 140 calculates a quantity of each type of fruit which is sufficient to satisfy the predicted demand (expected sales) of each type of fruit on each selected date. The controller component 140 then calculates the conditions for ripening the calculated quantity of fruit to a user selected level of ripeness on the selected date.

In some examples, the controller component 140 receives parameters 150 from the user 122 via the user interface device 120. The parameters 150 can also be received via the user device 126. The parameters 150 in other examples are pre-determined threshold settings for ripening fruit. For example, the parameters 150 can include one or more levels of ripeness for a selected type of fruit. In one example, the parameters 150 specify the same level of ripeness for all fruit to be ripened for a selected completion date.

In other examples, the parameters 150 include different levels of ripeness for different quantities of fruit. For example, the parameters can specify that half of all bananas be ripened to a fully ripe (completely yellow) state, one-fourth of the bananas be ripened to a half green and half yellow state, and the final one-fourth of the bananas be ripened to a mostly yellow with green tips state. In another example, the parameters 150 specifies that half of the bananas for a given day be ripened to a mostly yellow with green tips level of ripeness while the other half of the bananas be ripened to a fully yellow (no green) state of ripeness.

The parameters 150 are set to ensure fruit available for sale each day conforms to the preferences/expectations of customers in each location. The parameters 150 can be set in accordance with customer preference, local/regional customs, sales trends, etc.

The controller component 140 in some examples utilizes the predicted demand 148 and parameters 150 to calculate the settings/conditions within each chamber necessary to ripen the predicted amounts of fruit in one or more chambers to the preferred level of ripeness on the user-selected date for completion/sale. The settings/conditions calculated by the controller component 140 include the quantity of ethylene gas to be released into each chamber, the duration of time fruit in each chamber should be exposure to the ethylene gas, the temperature within each chamber and/or the humidity levels within each chamber. The controller component 140 utilizes the calculated settings to control/activate the ethylene gas metering device 110 to meter release of ethylene gas into each chamber. In other words, the ethylene gas metering device 110 routes ethylene gas into one or more chambers within the fruit ripening device.

Figure 2:
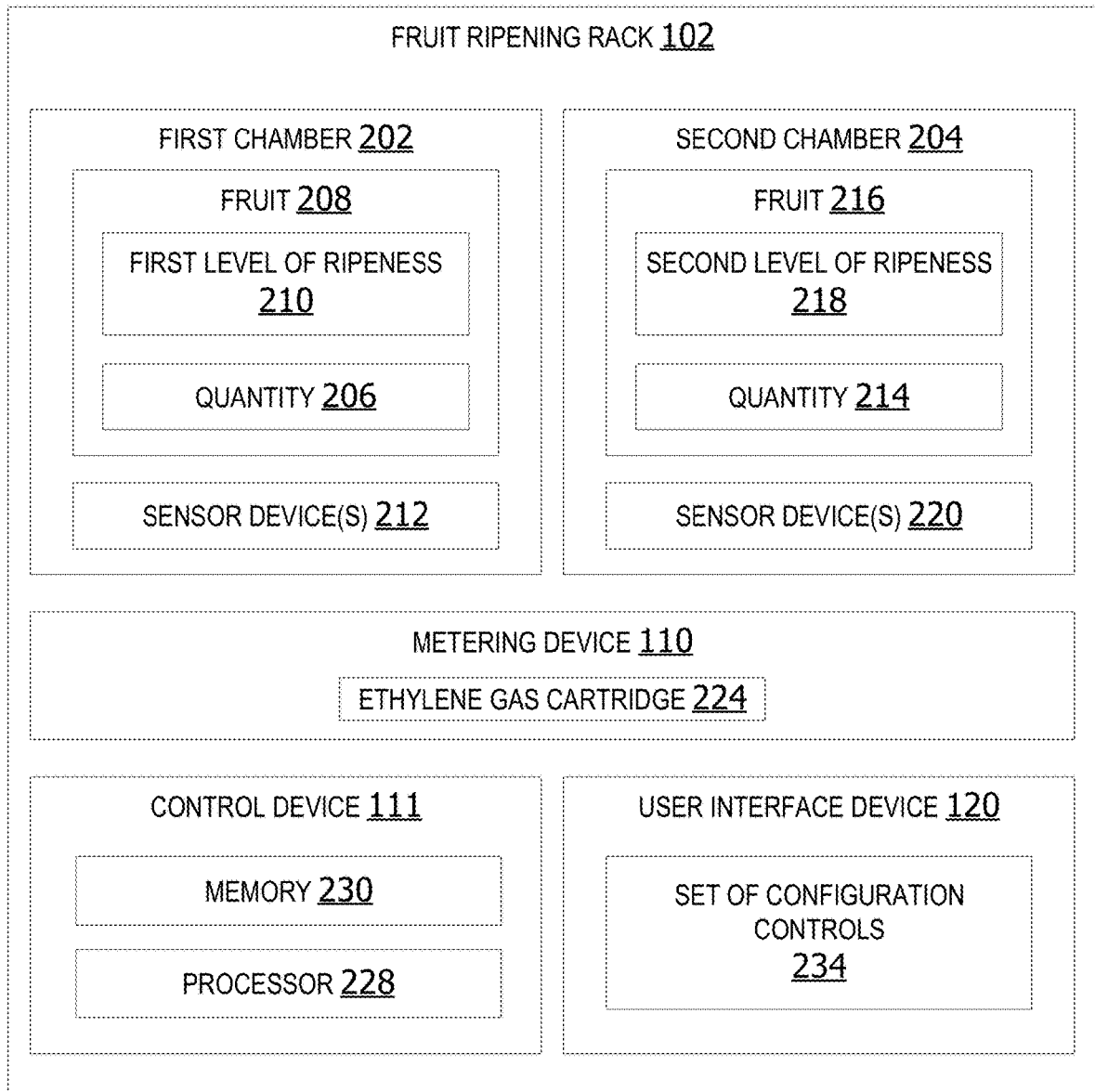
FIG. 2 is an exemplary block diagram illustrating a produce ripening device for ripening cases of produce at variable rates.

FIG. 2 is an exemplary block diagram illustrating a fruit ripening rack 102 for ripening cases of produce at variable rates. The fruit ripening rack 102 includes a first chamber 202 and a second chamber 204. The first chamber 202 is configured to ripen a quantity 206 of fruit 208 to a first level of ripeness 210.

The first chamber 202 can include one or more sensor device(s) 212, such as the set of sensor devices 132 in FIG. 1. The sensor device(s) 212 generates sensor data associated with the fruit 208 and/or the conditions inside the first chamber. The sensor data is utilized by the controller component to determine the current level of ripeness of the fruit 208, the amount of ethylene gas inside the first chamber 202, the temperature inside the first chamber 202 and/or the humidity level inside the first chamber 202.

The second chamber 204 is configured to ripen a quantity 214 of fruit 216 to a second level of ripeness 218. The second chamber 204 can include one or more sensor device(s) 220, such as the set of sensor devices 132 in FIG. 1. The sensor device(s) 220 generates sensor data associated with the fruit 216 and/or the conditions inside the second chamber. The conditions include the temperature, humidity, weight of the fruit 216, or any other conditions inside the second chamber. The sensor data is utilized by the controller component to determine the current level of ripeness of the fruit 216, the amount of ethylene gas inside the first chamber 202, the temperature inside the second chamber 204 and/or the humidity level inside the second chamber 204.

An ethylene gas metering device 110 meters/regulates the flow of ethylene gas into the first chamber 202 and the second chamber 204. The ethylene gas metering device 110 includes an ethylene gas source, such as the ethylene gas supply in FIG. 1. The ethylene gas source in this example is a multi-use ethylene gas cartridge 224. The ethylene gas cartridge 224 in some examples is a cylindrical container storing a quantity of ethylene gas. When the supply of ethylene gas within the ethylene gas cartridge 224 is exhausted or the amount of gas reaches a threshold minimum level, the ethylene gas cartridge 224 is replaced with a new cartridge.

The fruit ripening rack 102 in other examples includes a control device 111. The control device 111 includes a processor 228, such as, but not limited to, the processor 112 in FIG. 1. The processor 228 can include one or more processor for executing computer-executable instructions. The control device 111 includes a memory 230, such as, but not limited to, the memory 116 in FIG. 1. The memory stores the computer-executable instructions.

The fruit ripening rack 102 in other examples includes a user interface device 120. The user interface device 120 is a device for receiving user input, such as, but not limited to, the user interface device 120 in FIG. 1. The user interface device 120 includes a set of configuration controls 234.

The set of configuration controls 234 is a set of one or more control devices for receiving parameters for controlling the per-chamber fruit ripening/variable fruit ripening within the fruit ripening rack 102. The set of configuration controls 234 can be a touch screen controls, push button controls, a physical dial controller, a voice control system for receiving manual commands or any other controls for receiving configuration settings from a user.

Figure 3:
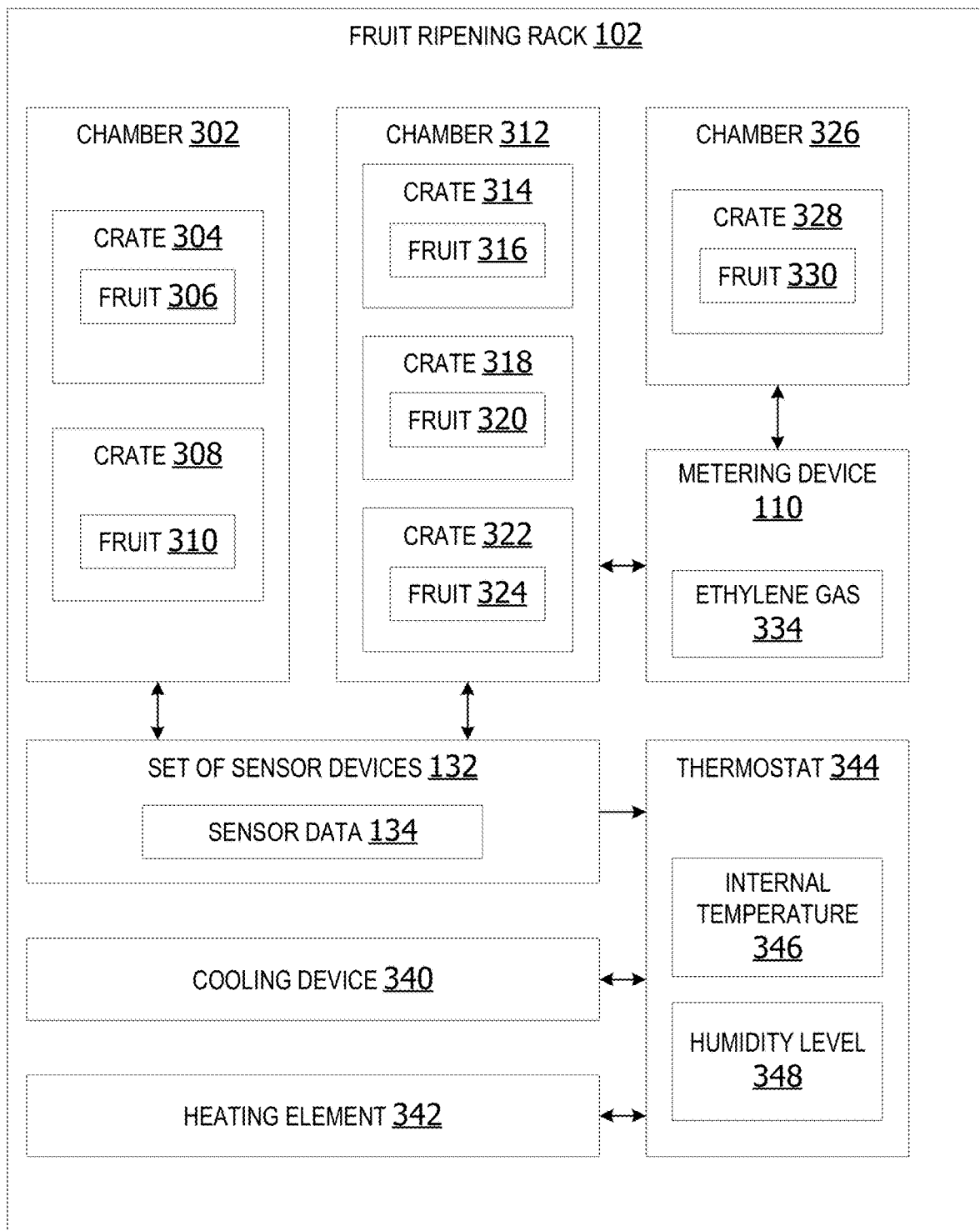
FIG. 3 is an exemplary block diagram illustrating a fruit ripening rack including a plurality of chambers.

FIG. 3 is an exemplary block diagram illustrating a fruit ripening rack 102 including a plurality of chambers. The plurality of chambers in this example includes three chambers. Each chamber is configured to hold one or more crates. At any given time, a chamber can be empty or the chamber can hold one or more crates of fruit.

A crate can be a case, a crate, a box or other container of fruit. Each crate holds a plurality of instances of the fruit. If the type of fruit is banana, the crate holds a plurality of instances of bananas or a plurality of bunches of bananas. In one non-limiting example, a crate of bananas holds between fifty and one-hundred bananas. In another non-limiting examples, a crate holds between twenty and eighty bananas.

The first chamber 302 in this example stores a first crate 304 of fruit 306 and a second crate 308 of fruit. The fruit in the first crate 304 and second crate 308 are being ripened at the same rate to the same level of ripeness for completion on the same date of completion.

The second chamber 312 in this example stores a first crate 314 of fruit 316, a second crate 318 of fruit 320 and a third crate 322 of fruit 324. All the fruit within the crate 314, crate 318 and crate 322 are ripened within the second chamber 312 at the same rate to the same level of ripeness for completion on the same date of completion. However, the fruit in the first chamber can be ripened at a different rate than the fruit in the second chamber 312. Likewise, the fruit in the first chamber 302 can be ripened to a different level of ripeness than the fruit in the second chamber 312 even if the date of completion is the same for both chambers. Moreover, the fruit in the first chamber 302 can be ripened to the same level of ripeness as the fruit in the second chamber but with a different date of completion. For example, the fruit in the first chamber can be ready a day after the fruit in the second chamber.

The third chamber 326 in this example stores a single crate 328 of fruit 330. The fruit in the first chamber 302 and the second chamber 312 can be ripened at a different rate than the fruit in the first chamber 302. Likewise, the fruit in the first chamber 302 and the second chamber 312 can be ripened to a different ripeness level than the fruit in the third chamber 326. The fruit in the third chamber 326 can also be ripened to a completion date that is the same or different than the completion date for fruit in the first chamber 302 or the second chamber 312.

A set of sensor devices 132 generates sensor data 134 associated with the contents and/or conditions within each chamber in the plurality of chambers. The set of sensor devices 132 is a set of one or more devices. In some examples, at least one sensor device is located within each chamber in the plurality of chambers.

The fruit ripening rack 102 optionally includes a cooling device 340 for lowering an internal temperature inside one or more chambers. A cooling device 340 in some examples is implemented as a fan. In other examples, the cooling device 340 is implemented as a condenser.

A heating element 342 can be included within the fruit ripening rack 102. The heating element 342 can be implemented as a heating coil or other heat generating device.

A thermostat 344 is a device that controls the internal temperature 346 within each chamber in the plurality of chambers, such as, but not limited to, chamber 302, chamber 312 and/or chamber 326. The thermostat 344 can optionally also control the humidity level 348 within each chamber. In other words, the thermostat 344 in this example controls/adjusts variable temperatures/conditions within each chamber.

Each chamber in the plurality of chambers can have a different internal temperature and/or a different humidity level to provide varying/disparate ripening rates for fruit within each chamber. Thus, the temperature within a first chamber can be sixty-four degrees while the temperature in the second chamber is only fifty-eight degrees.

In this example, the heating and/or cooling device 340 is incorporated within the fruit ripening drawer. In other examples, the fruit ripening drawer is incorporated within or added into a refrigeration appliance which provides the heating and/or cooling to adjust temperature inside each chamber.

Figure 4:
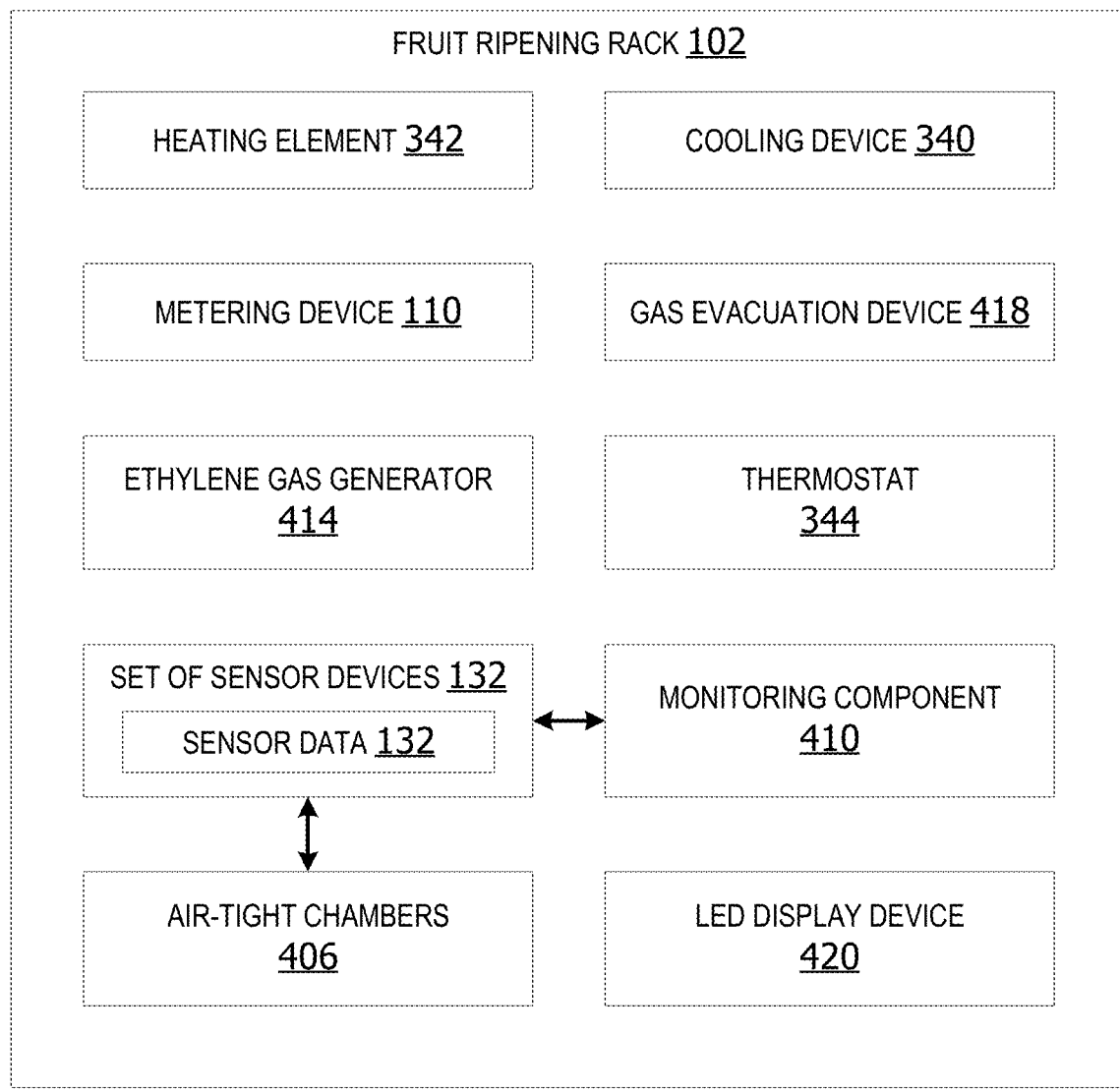
FIG. 4 is an exemplary block diagram illustrating a stand-alone fruit ripening rack.

FIG. 4 is an exemplary block diagram illustrating a stand-alone fruit ripening rack 102. The fruit ripening rack 102 includes a heating element 342 and/or a cooling device 340 for controlling the temperature inside each chamber in the one or more air-tight chambers 406 within the fruit ripening rack 102. The heating element 342 can include a heating coil or other device for increasing temperature inside a chamber. The cooling device 340 in some non-limiting examples includes a condenser or other device for lowering temperature within the chamber.

A set of one or more sensor devices 407 associated with the air-tight chambers 406 generates sensor data 134 associated with conditions within the air-tight chambers 406. The set of sensor devices 132 can include one or more weight sensors, temperature sensors, pressure sensors, humidity sensors (hygrometer), ethylene gas sensors, image capture devices, or any other type of sensor devices. The image capture devices can include infrared sensors and/or cameras. The sensor data 134 can include, for example but without limitation, weight data, temperature data, humidity level data, pressure data, ethylene gas concentration data, image data, infrared data, camera images, etc.

A monitoring component 410 analyzes the sensor data 134 generated by the set of sensor devices 132 within the plurality of air-tight chambers 406 to determine the conditions/state within each chamber. The monitoring component 410 determines current temperature within each chamber, humidity levels within each chamber, weight of fruit within each chamber, appearance/color of fruit within each chamber, concentration of ethylene gas within each chamber and/or any other conditions within each chamber. If the temperature within a given chamber is greater than or less than a desired temperature for fruit ripening, a thermostat 344 activates the heating element 342 and/or the cooling device 340 to adjust the temperature inside the one or more chambers.

In this example, an ethylene gas generator 414 supplies ethylene gas to a gas metering device 110. The device can also include a liquid ethyl alcohol cartridge connected to the ethylene gas generator 414. The ethylene gas generator 414 converts the liquid ethyl alcohol into ethylene gas for release into at least one chamber in the fruit ripening rack 102. The ethylene gas generator 414 can be a catalytic converter.

When the fruit in a given chamber has been exposed to ethylene gas for a sufficient amount of time, a gas evacuation device 418 removes the ethylene gas from the given chamber. The gas evacuation device 418 in some example pulls the ethylene gas out of the chamber via a fan or suction device. The evacuated ethylene gas can be stored in a cartridge, bag or other container. In other examples, the gas evacuation device 418 evacuates the ethylene gas out of the fruit ripening drawer via a vent or other opening that permits the ethylene gas to be expelled from at least one chamber.

A light emitting diode (LED) display device 420 is included in some examples. If the cartridge of compressed ethylene gas is empty or partially empty (level below a threshold), the LED display device 420 outputs a cartridge replacement notification to notify at least one user to replace a reusable ethylene gas cartridge replacement.

Figure 5:
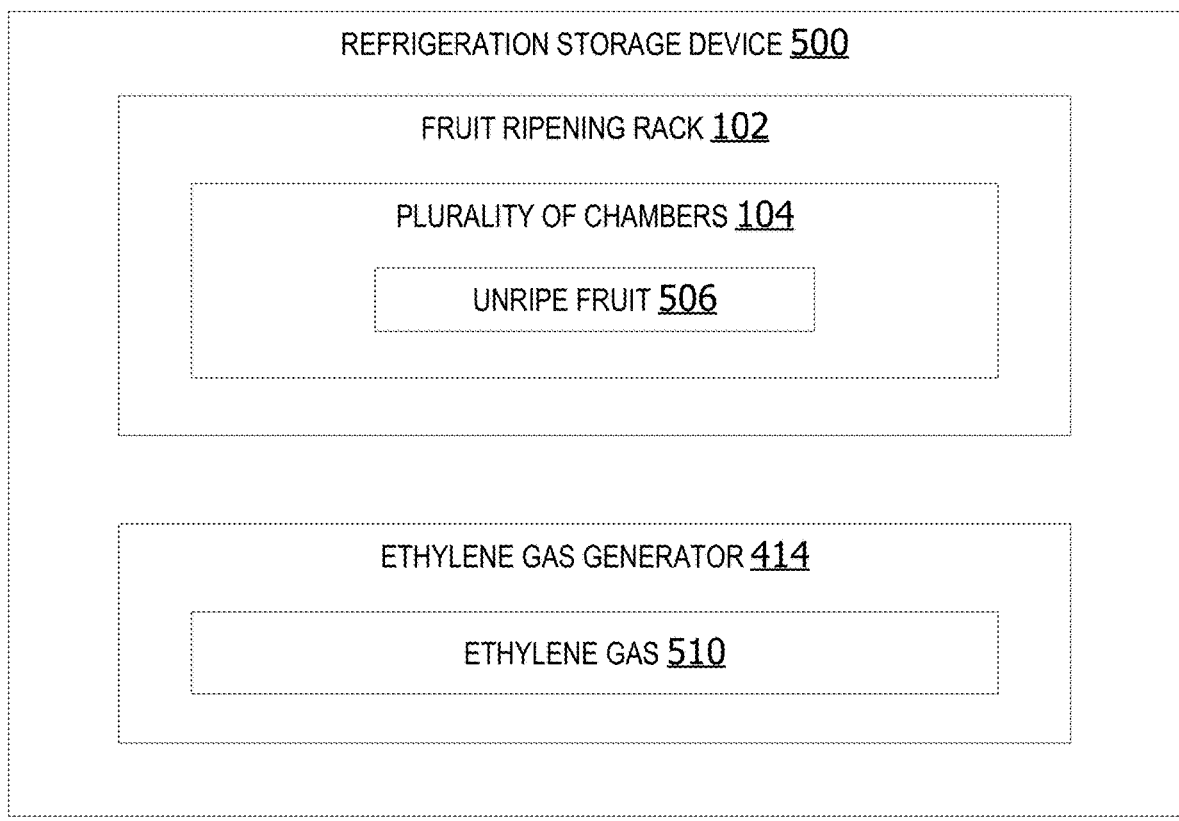
FIG. 5 is an exemplary block diagram illustrating a fruit ripening rack incorporated within a refrigeration storage device.

FIG. 5 is an exemplary block diagram illustrating a fruit ripening rack 102 incorporated within a refrigeration storage device 500. The refrigeration storage device 500 can be, without limitation, a walk-in refrigerator/walk-in freezer or any other refrigerated storage device capable of storing multiple crates of produce.

The fruit ripening rack 102 includes a plurality of chambers 104. One or more chambers in the plurality of chambers 104 is configured to store unripe fruit 506 for ripening at configurable ripening rates to achieve customized levels of ripeness.

The fruit ripening rack 102 optionally includes an ethylene gas generator 414 for generating ethylene gas from liquid ethanol. In other examples, the fruit ripening rack 102 includes an ethylene gas cartridge instead of an ethylene gas generator.

The refrigeration storage device 500 provides the heating and/or cooling to control the internal temperature inside each chamber in this example. The fruit ripening rack 102 in this non-limiting example does not include a cooling device or a heating device.

Figure 6:
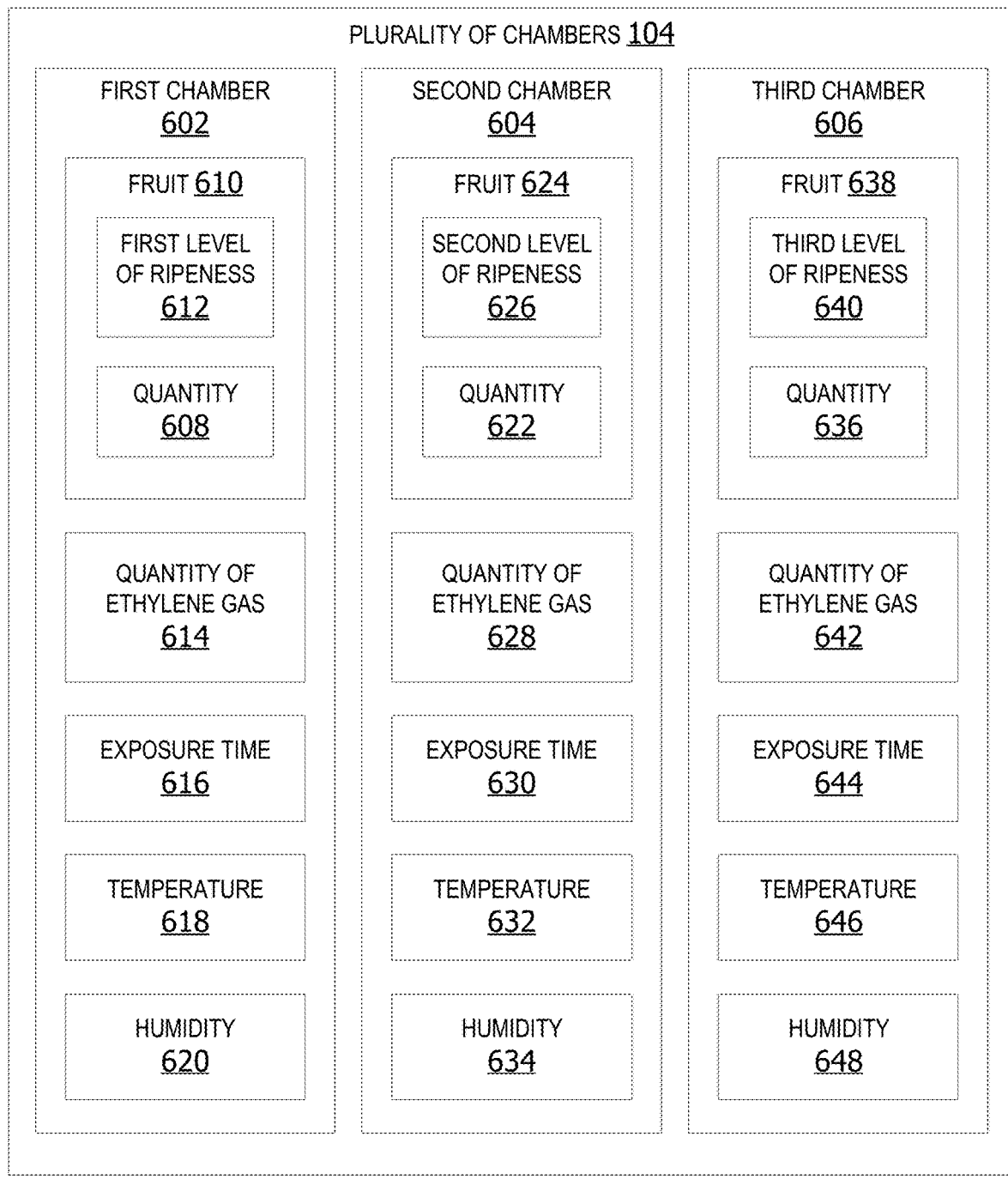
FIG. 6 is an exemplary block diagram illustrating a plurality of chambers within a fruit ripening rack.

FIG. 6 is an exemplary block diagram illustrating a plurality of chambers 104 within a fruit ripening rack, such as, but not limited to, the fruit ripening rack 102 in FIG. 1, FIG. 2, FIG. 3, FIG. 4 and FIG. 5. Each chamber in this example is an insulated, air-tight chamber.

A chamber in the plurality of chambers 104 can be any size or shape capable of accommodating a crate or other container of unripe produce. A chamber can be a rectangular-shaped chamber, an oval shaped chamber, a square/cube shaped chamber, or any other shape within the fruit ripening rack. A chamber in some non-limiting examples includes a hinged or sliding door which opens to permit insertion or removal of fruit from the chamber. In other examples, a chamber slides out perpendicular to the floor to permit a user to place fruit into the chamber or remove fruit from the chamber via an opening/aperture on a top surface of the chamber which becomes accessible when the chamber slides out.

In this non-limiting example, the plurality of chambers 104 includes a first chamber 602, a second chamber 604 and a third chamber 606. In other examples, the plurality of chambers 104 includes two chambers, four chambers, five chambers, six chambers or any other number of chambers. In one non-limiting example, the plurality of chambers 104 includes seven chambers corresponding to each day within a week. In another example, the plurality of chambers 104 includes four chambers.

In this example, the first chamber 602 includes a first quantity 608 of fruit 610 being ripened to a first level of ripeness 612. The first quantity 608 is an amount of fruit predicted to meet a predicted demand for a selected future date based on historical transaction data and/or seasonal demand. A first quantity of ethylene gas 614 is released into the first chamber 602 for a first exposure time 616. The first chamber 602 is maintained at a first temperature 618 and a first humidity 620 to assist ripening of the fruit 610.

The second chamber 604 in this example includes a quantity 622 of unripe fruit 624 being ripened to a second level of ripeness 626 to satisfy a predicted demand. The second level of ripeness 626 in this example is a different level of ripeness than the first level of ripeness 612. In other examples, the first level of ripeness 612 and the second level of ripeness 626 are the same level of ripeness. A quantity of ethylene gas 628 is released into the second chamber 604 for an exposure time 630 at a temperature 632 and humidity 634 level calculated to ripen the fruit 624 to the selected level of ripeness 626 by a user-selected date of completion.

The third chamber 606 in this example includes a quantity 636 of unripe fruit 638 being ripened to a third level of ripeness 640. The third level of ripeness 640 in this example is a different level of ripeness than the first level of ripeness 612 and the second level of ripeness 626. In other examples, the first level of ripeness 612, the second level of ripeness 626 and the third level of ripeness 640 are the same level of ripeness. A quantity of ethylene gas 642 is released into the third chamber 606 for an exposure time 644 at a temperature 646 and humidity 648 level calculated to ripen the fruit 638 to the selected level of ripeness 640 by a user-selected date of completion.

In this example, each chamber within the fruit ripening rack is an insulated, air-tight chamber capable of maintaining different temperatures/conditions than other chambers within the fruit ripening rack. In this manner, a case of unripe bananas placed in the first chamber and another case of unripe bananas placed inside the second chamber on the same day can be ready (fully ripened to the selected level of ripeness) on different days due to configurable ripening rates within each chamber. The device utilizes/provides onboard refrigeration (vapor compression or Peltier), ventilation for releasing/evacuating the ethylene gas when the initial exposure is complete. The device in some non-limiting examples utilizes a manifold and metering valves (ports) to introduce ethylene gas into a given chamber and to evacuate the ethylene gas from the chamber when ripening has reached a desired/pre-determined level of ripeness.

Figure 7:
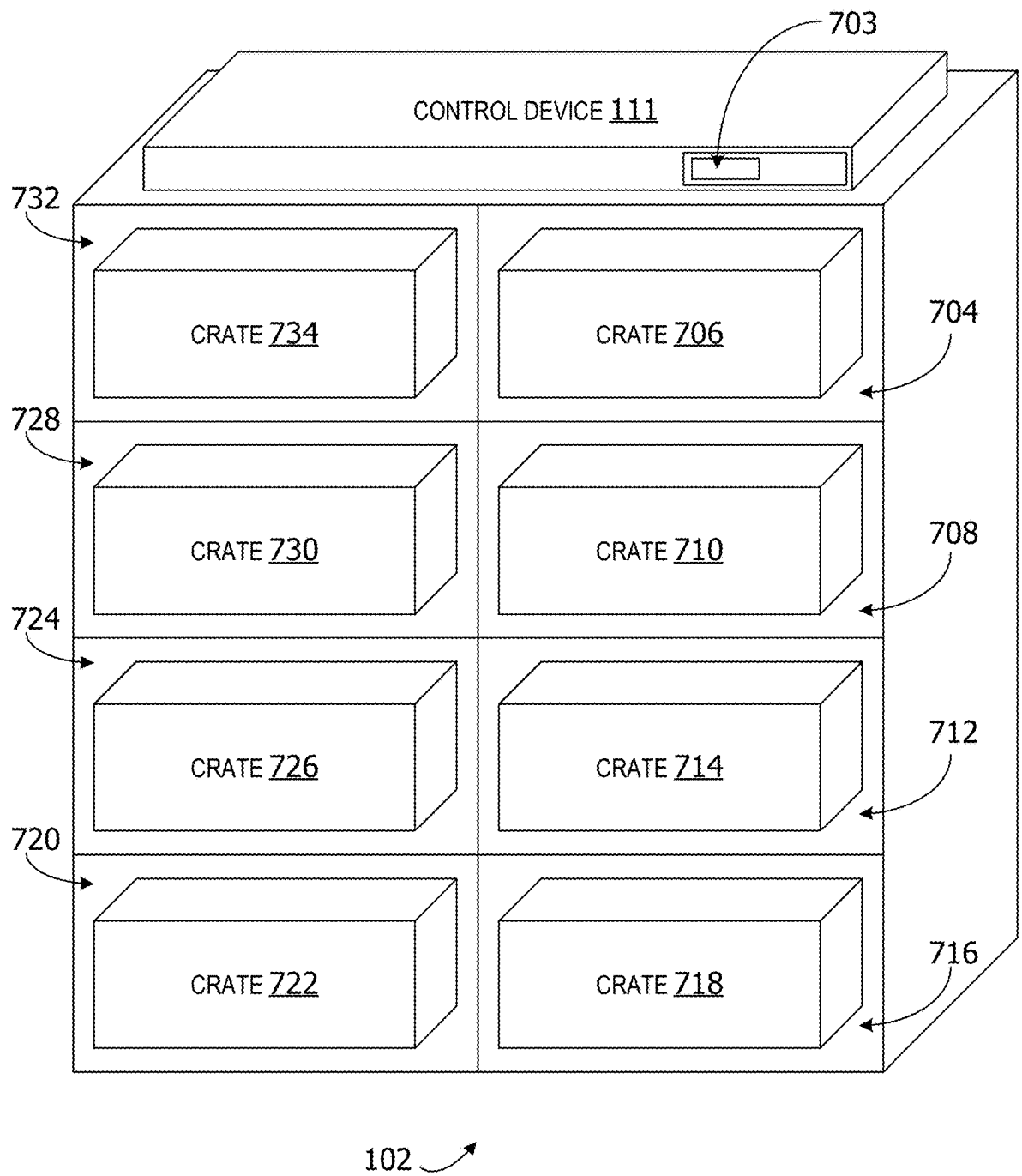
FIG. 7 is an exemplary block diagram illustrating a fruit ripening rack including a control device.

FIG. 7 is an exemplary block diagram illustrating a fruit ripening rack 102 including a control device 111. The control device 111 is a device including a processor and a memory. The control device 111 can optionally also include a user interface 703. The user interface 703 includes configuration controls for selecting configurations settings for one or more chambers within the fruit ripening rack 102. Configuration controls can include a touch screen, switches, dials, or other control devices for setting a level of ripeness, completion date, or other configurable parameters for ripening fruit within each chamber.

The fruit ripening rack 102 includes a plurality of chambers. The plurality of chambers includes two or more chambers. In this example, the plurality of chambers includes eight chambers. Each chamber in the plurality of chambers is sized/has dimensions sufficient to store/contain one or more crates of fruit. In this example, each chamber is sized to store/contain a single crate of fruit for ripening.

The plurality of chambers in this example includes a chamber 704 storing a crate 706, a chamber 708 holding a crate 710, a chamber 712 holding a crate 714, a chamber 716 storing a crate 718, a chamber 720 containing crate 722, a chamber 724 holding crate 726, a chamber 728 storing crate 730, and a chamber 732 containing crate 734.

Figure 8:
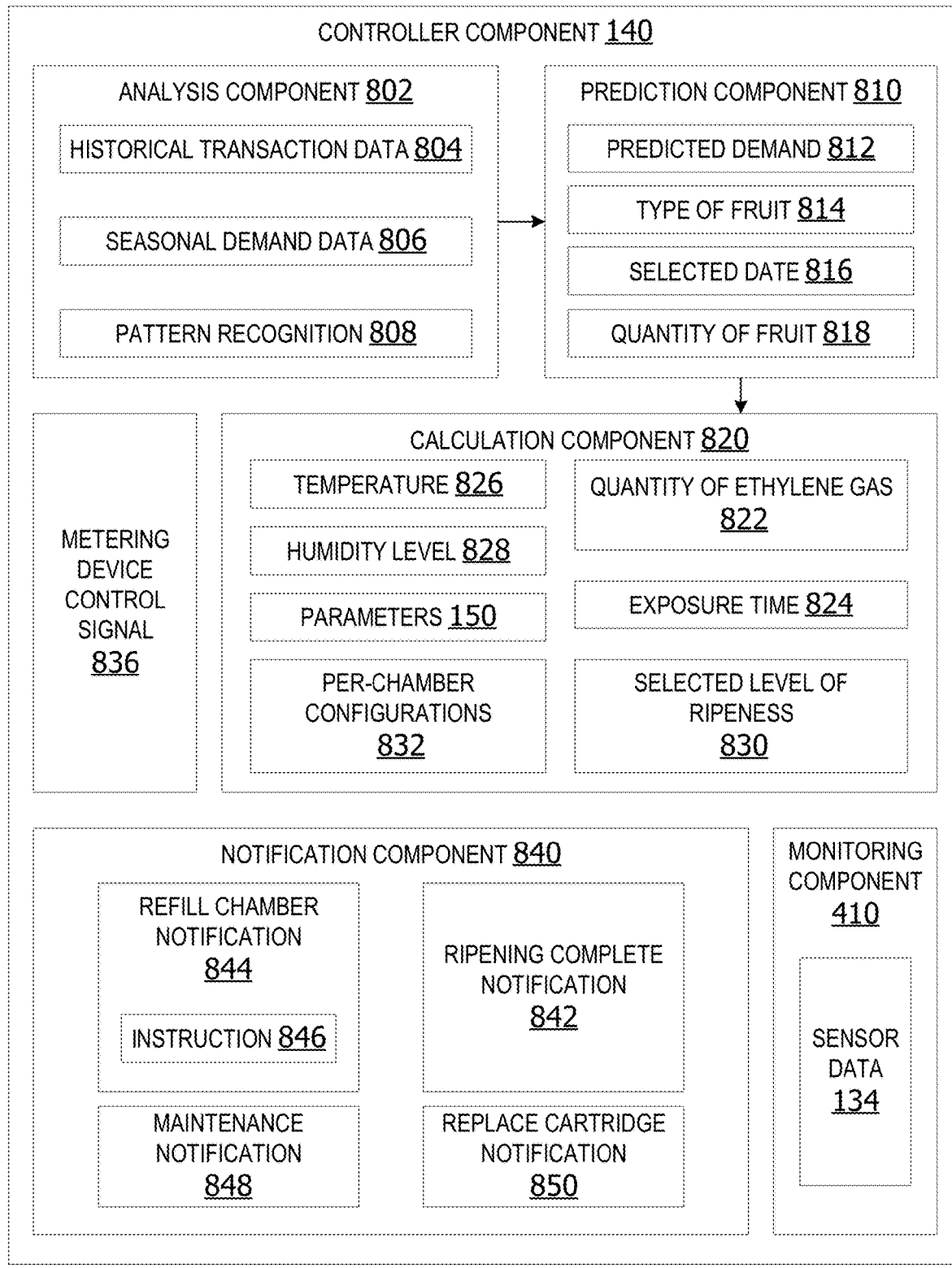
FIG. 8 is an exemplary block diagram illustrating a controller component.

FIG. 8 is an exemplary block diagram illustrating a controller component 140. An analysis component 802 analyzes historical transaction data 804 and seasonal demand data 806 associated with a selected location using pattern recognition 808. The historical transaction data 804 and seasonal demand data 806 is obtained from a data storage, such as, but not limited to, the data storage device 128 in FIG. 1. The data storage can include a database, such as, but not limited to, the database 1000 in FIG. 10.

The historical transaction data 804 includes data associated with previous transactions. The historical transaction data 804 can include, without limitation, data such as the transaction data 136 in FIG. 1.

A prediction component 810 generates a predicted demand 812 for a selected type of fruit 814 on a selected date 816. The prediction component can calculate a predicted demand for each type of fruit for each future date selected by the user. The prediction component 810 determines the quantity of fruit 818 to satisfy the predicted demand 812 on the selected date 816.

A calculation component 820 calculates per-chamber configurations 832 for each chamber in the plurality of chambers. The per-chamber configurations 832 include the temperature 826 inside a selected chamber, the humidity level 828 inside a selected chamber, the quantity of ethylene gas 822 released inside the selected chamber and/or the exposure time 824 for fruit in the selected chamber.

The calculation component 820 generates the per-chamber configurations 832 based on the quantity of fruit 818 and/or parameters 150. The parameters 150 include the user-selected level of ripeness.

The calculation component 820 in some examples calculates a first quantity of ethylene gas and a first exposure time to complete ripening of the first quantity of fruit in the first chamber to a selected level of ripeness on the first selected date and a second quantity of ethylene gas and a second exposure time to complete ripening of the second quantity of fruit in the second chamber to the selected level of ripeness on the second selected date.

The calculation component 820 in other examples calculates a first temperature and a first humidity level to complete ripening of the first quantity of fruit in the first chamber to a selected level of ripeness on the first selected date. The calculation component 820 calculates a second temperature and a second humidity level to complete ripening of the first quantity of fruit in the first chamber to a selected level of ripeness on the first selected date.

The controller component 140 sends a metering device control signal 836 to activate an ethylene gas metering device, such as, but not limited to, the metering device 110 in FIG. 1, FIG. 2, FIG. 3 and FIG. 4 above. The metering device control signal 836 triggers the metering device to release the first quantity of ethylene gas into the first chamber for the first exposure time on condition sensor data 134 generated by a set of sensor devices associated with the plurality of chambers indicates the first quantity of fruit is present within the first chamber. The controller component 140 sends a metering device control signal 836 to the metering device to trigger the metering device to release the second quantity of ethylene gas into the second chamber for the second exposure time on condition the sensor data 134 indicates the second quantity of fruit is present within the second chamber.

A monitoring component 410 analyzes the sensor data 134 generated by a set of sensor devices within the plurality of chambers. The monitoring component 410 analyzes the sensor data 134 to determine the current temperature and/or current humidity levels within each chamber. The monitoring component 410 can optionally also analyze image data or other sensor data to determine the current level of ripeness of fruit within each chamber.

A notification component 840 generates a ripening complete notification 842 indicating at least one case of fruit in a selected chamber has reached a selected level of ripeness in some examples. The notification component 840 generates a refill chamber notification 844 including an instruction 846 to place a calculated quantity within a selected chamber in response to sensor data 134 indicating the selected chamber is empty.

In other examples, the notification component 840 outputs a maintenance notification if sensor data 134 indicates a maintenance or repair issue associated with the fruit ripening rack. A maintenance or repair issue can occur if ethylene gas fails to release into the chamber in response to triggering the metering device, temperature inside a chamber falling outside a desired temperature due to a malfunction in a cooling device or heating device, or another mechanical fault.

The notification component 840 in still other examples generates a replace cartridge notification 850 in response to an empty ethylene gas cartridge. In other examples, the notification component 840 can output the replace cartridge notification 850 if the level of ethylene gas within the cartridge falls below a threshold minimum level.

Figure 9:
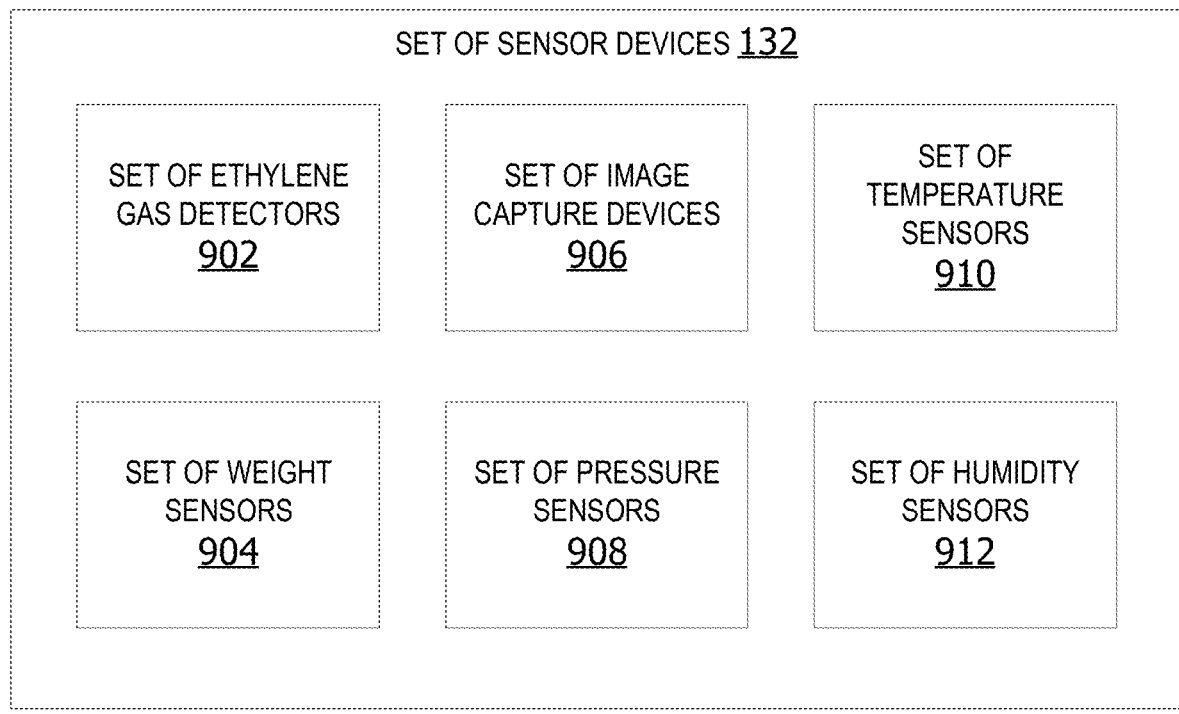
FIG. 9 is an exemplary block diagram illustrating a set of sensor devices associated with chambers in a fruit ripening rack.

FIG. 9 is an exemplary block diagram illustrating a set of sensor devices 132 associated with chambers in a fruit ripening rack. The set of sensor devices 132 can include, without limitation, a set of one or more ethylene gas detectors for detecting a presence/absence of ethylene gas and/or the concentration of ethylene gas within each chamber. The set of sensor devices 132 optionally includes a set of one or more weight sensors 904 for generating weight data associated with contents of each chamber and/or a set of one or more pressure sensors 908 for generating pressure data associated with fruit placed inside one or more chambers.

A set of one or more image capture devices 906 can be included. An image capture device can include an infrared sensor, a camera, or any other type of image capture device. Image data generated by the set of image capture devices 906 can be analyzed to determine whether a chamber is empty, identify a quantity of fruit within each chamber, identify a type of fruit within each chamber, identify a current level of ripeness of fruit within each chamber, etc.

A set of one or more temperature sensors 910 generates temperature data associated with a current temperature inside each chamber. A set of one or more humidity sensors 912 can be optionally provided to identify a level of humidity within each chamber.

The set of sensor devices 132 can include other sensor devices not shown in FIG. 9. For example, the set of sensor devices 132 can include photosensors, spectrometers, or other sensor devices.

Figure 10:
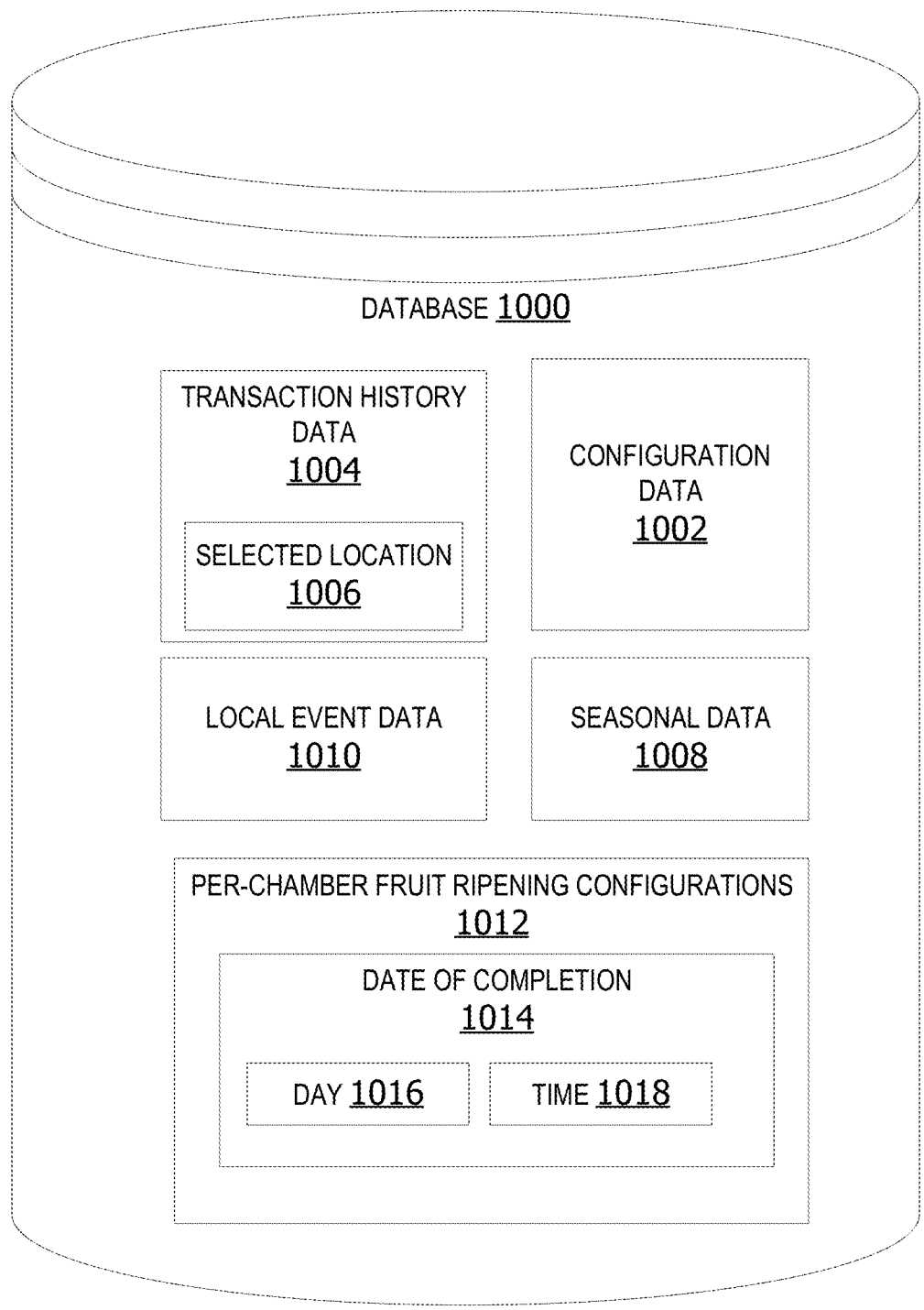
FIG. 10 is an exemplary block diagram illustrating a database storing fruit ripening data.

FIG. 10 is an exemplary block diagram illustrating a database 1000 storing fruit ripening data. The fruit ripening data can include configuration data 1002. The configuration data 1002 is data associated with user-selected configurations for each chamber in a fruit ripening rack. The configuration data 1002 is provided by a user via a user interface device on the fruit ripening rack or via a fruit ripening application running on a user device. The configuration data can include ripeness level settings for each chamber, type of fruit in each chamber, ripening dates of completion for each chamber, temperature settings for each chamber, etc.

The database 1000 can optionally also include transaction history data 1004 for a selected location 1006 or similar location. In other words, transaction history data for a selected retail location (store) and/or other similar stores (similar location, region, size, etc.) can be utilized. The database 1000 can also include local event data 1010, such as sporting events, holidays, elections, last day of school, first day of school, parades, etc.

Per-chamber fruit ripening configurations 1012 can also be stored in the database 1000. The per-chamber fruit ripening configurations 1012 includes the date of completion 1014. The date of completion 1014 for ripening fruit in a given chamber to the desired level of ripeness can include a day (day of week or day of month) and/or time of day.

Figures 11, 12:
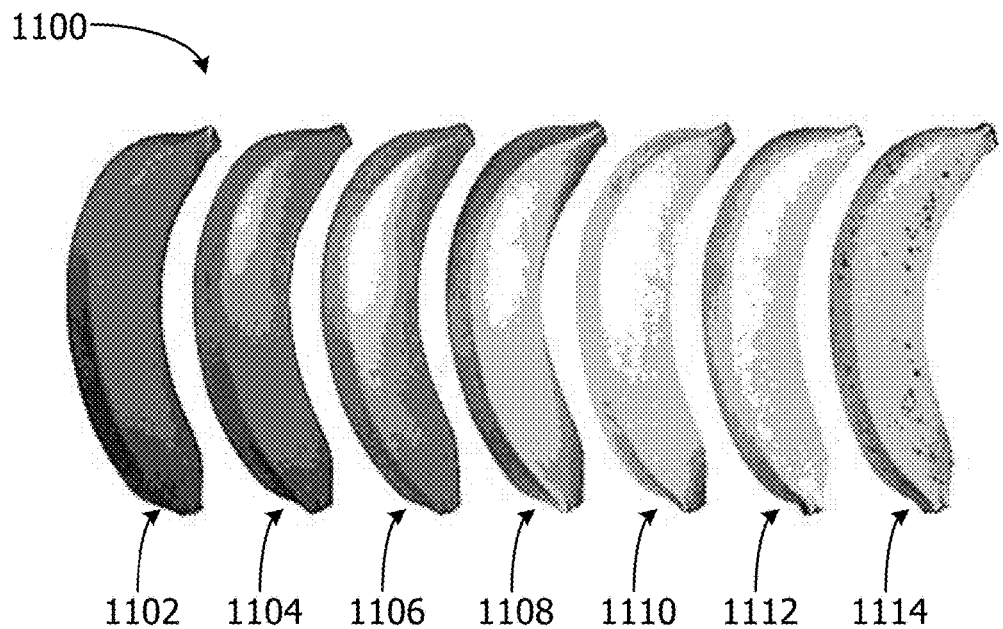
FIG. 11 is an exemplary block diagram illustrating levels of ripeness for bananas.
FIG. 12 is an exemplary block diagram illustrating a set of temperature settings for ripening fruit.

FIG. 11 is an exemplary block diagram illustrating levels 1100 of ripeness for bananas. The levels of ripeness in these non-limiting examples includes completely green 1102, green with a trace of green 1104, half green/half yellow 1106, more yellow than green 1108, mostly yellow with green tips 1110, all yellow 1112 and yellow flecked with brown 1114. The levels of ripeness shown in FIG. 11 are non-limiting. In other examples, the levels of ripeness includes additional levels of ripeness not shown in FIG. 11. Likewise, the available levels of ripeness for the fruit ripening rack can include fewer levels of ripeness than shown in FIG. 11.

FIG. 12 is an exemplary block diagram illustrating a set of temperature settings 1200 for ripening fruit. In some examples, the rate of ripening of produce within a selected chamber is controlled via ripening time, temperature and/or humidity. The ripening time is the amount of time between initial exposure to ethylene gas and the scheduled date of completion when the produce is scheduled for removal from the device for sale and/or consumption. The temperature is the temperature inside a selected chamber during the ripening time. Each chamber can have a different temperature inside the chamber. The humidity is the humidity level within each chamber.

For example, if the length of time between the initial exposure to the ethylene gas is three days, the temperature within the chamber is higher than if the ripening time is eight days. In other words, the longer the ripening time, the lower the temperature necessary to ripen produce to the selected ripeness level.

If the date of completion is four days 1202 away, in this example, the temperature within the chamber on the first day is set to sixty-four degrees and lowered to sixty degrees on the fourth day (completion date) when ripening to the selected level is complete. If the date for completion is five days 1204, the temperature is maintained at sixty-two degrees until the fifth day when the temperature is lowered to sixty degrees.

In another example, a six-day schedule 1206 begins at a lower sixty-two degrees on the first day and gradually decreases to fifty-eight degrees on the sixth day. For a seven-day schedule 1208, the temperature is set to sixty degrees on the first day through the fifth day and then lowered to fifty-eight degrees for the sixth and seventh day. If the date of completion is in eight days 1210, the temperature is maintained at fifty-eight degrees for the entire eight days of fruit ripening.

The examples are not limited to the ripening times and temperatures shown in FIG. 12. In other examples, produce is ripened at other temperatures within different ripening time-periods not shown in FIG. 12. For example, some types of produce can be ripened within a twenty-four or forty-eight-hour ripening time at a higher temperature, such as sixty-eight degrees or seventy-two degrees depending upon humidity levels within the chambers, pressure level within the chambers and/or any previous exposure to ethylene gas which alters the effect of temperature on ripening time.

Figure 13:
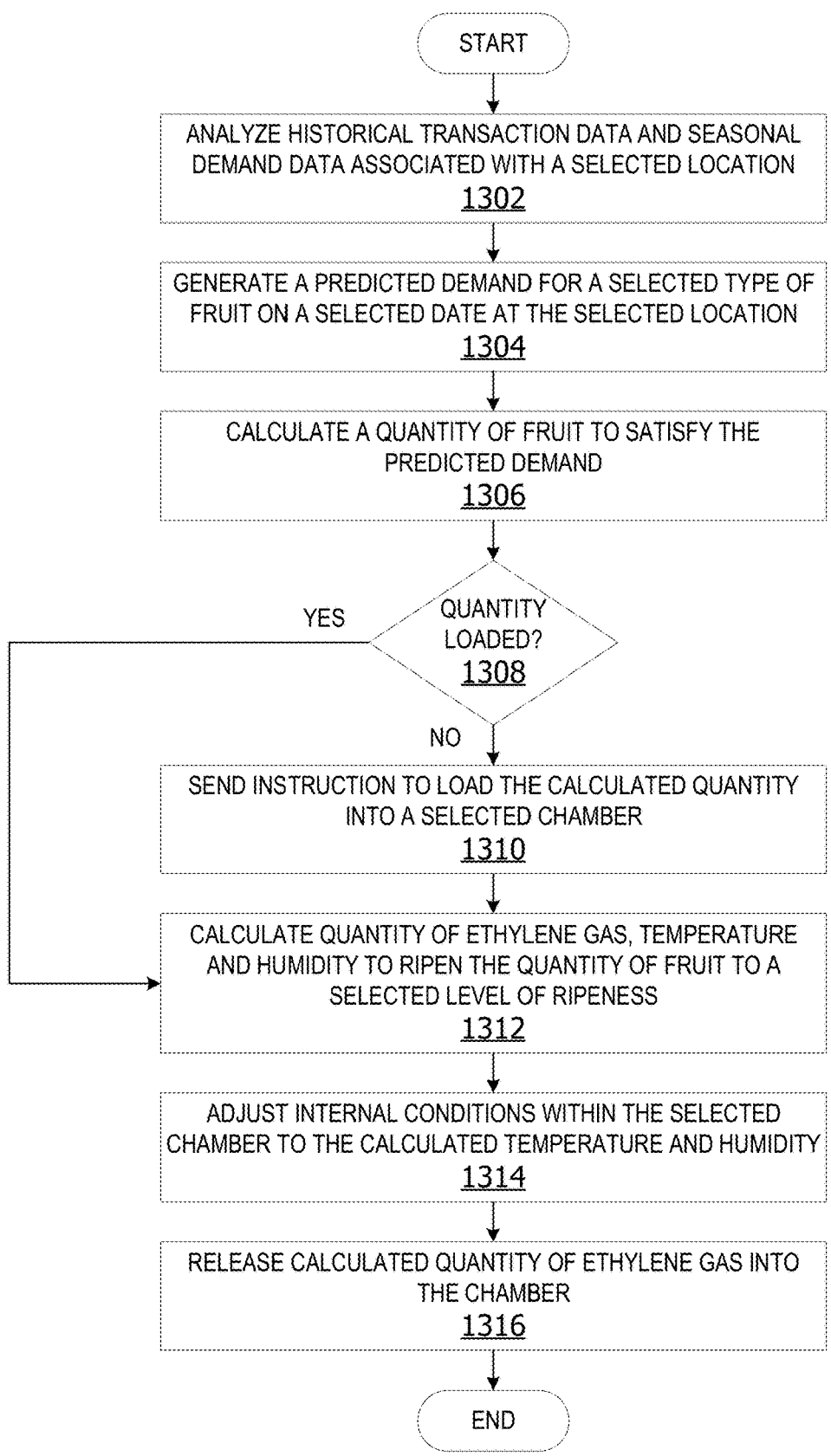
FIG. 13 is an exemplary flow chart illustrating operation of the computing device to calculate predicted demand of ripened fruit for a selected location.

FIG. 13 is an exemplary flow chart illustrating operation of the computing device to calculate predicted demand of ripened fruit for a selected location. The process shown in FIG. 13 can be performed by a controller component, executing on a processor within a fruit ripening rack, such as the fruit ripening rack 102 or the user device 126 in FIG. 1.

The process begins by analyzing historical transaction data and seasonal demand data associated with a selected location at 1302. The selected location is a store or other retail location. The historical transaction data and/or seasonal demand data can be data for the selected location or a similar location. A controller component generates a predicted demand for a selected type of fruit on a selected date at the selected location. The controller component calculates a quantity of fruit to satisfy the predicted demand at 1306. The controller component determines whether the calculated quantity of fruit is loaded into the selected chamber at 1308. If no, the controller component sends an instruction to load the calculated quantity the selected chamber at 1310. The controller component calculates a quantity of ethylene gas, temperature and humidity to ripen the quantity of fruit to a selected level of ripeness at 1312. The controller component adjusts internal conditions within the selected chamber to the calculated temperature and humidity at 1314. The controller component releases the calculated quantity of ethylene gas into the chamber at 1316. The process terminates thereafter.

While the operations illustrated in FIG. 13 are performed by a computing device, aspects of the disclosure contemplate performance of the operations by other entities. For example, a cloud service can perform one or more of the operations.

Figure 14:
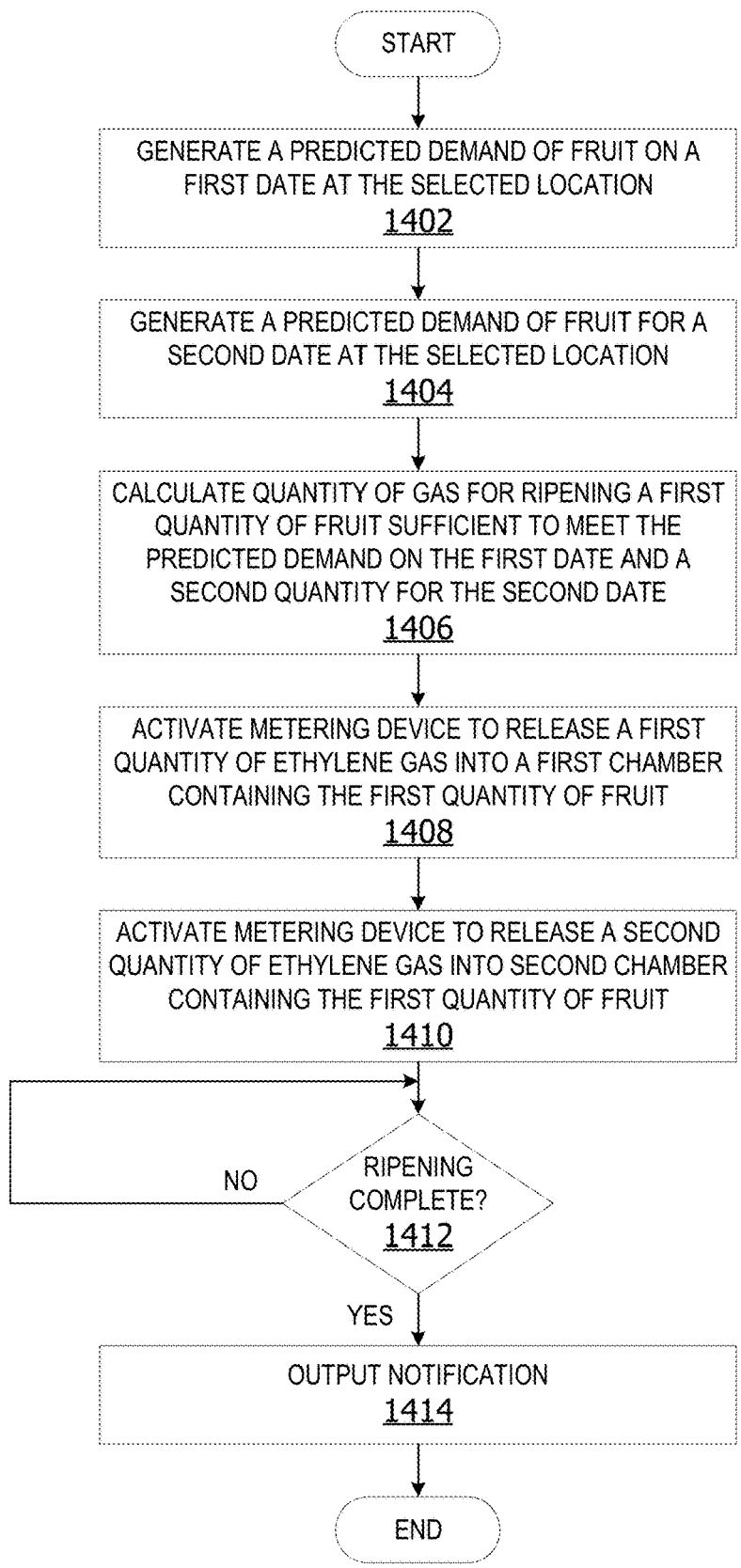
FIG. 14 is an exemplary flow chart illustrating operation of the computing device to customize settings within a plurality of chambers for ripening fruit at variable rates based on predicted demand.

FIG. 14 is an exemplary flow chart illustrating operation of the computing device to customize settings within a plurality of chambers for ripening fruit at variable rates based on predicted demand. The process shown in FIG. 14 can be performed by a controller component, executing on a processor within a fruit ripening rack, such as the fruit ripening rack 102 or the user device 126 in FIG. 1.

The process begins by generating a predicted demand of fruit on a first date at the selected location at 1402. The controller component generates a predicted demand of fruit for a second date at the selected location at 1404. The controller component calculates a quantity of ethylene gas to ripen a first quantity of fruit sufficient to meet the predicted demand on the first date and a second quantity of fruit sufficient to meet the predicted demand on the second date at 1406. The controller component activates a metering device to release a first quantity of ethylene gas into a first chamber containing the first quantity of fruit at 1408. The controller component activates the metering device to release a second quantity of ethylene gas into a second chamber containing the second quantity of fruit at 1410. The controller component determines if ripening in one of the chambers is complete at 1412. If yes, the controller component outputs a notification at 1414. The notification can be output via a user interface on the fruit ripening rack or sent to a user device via a network. The process terminates thereafter.

While the operations illustrated in FIG. 14 are performed by a control device or a computing device, aspects of the disclosure contemplate performance of the operations by other entities. For example, a cloud service can perform one or more of the operations.

Figure 15:
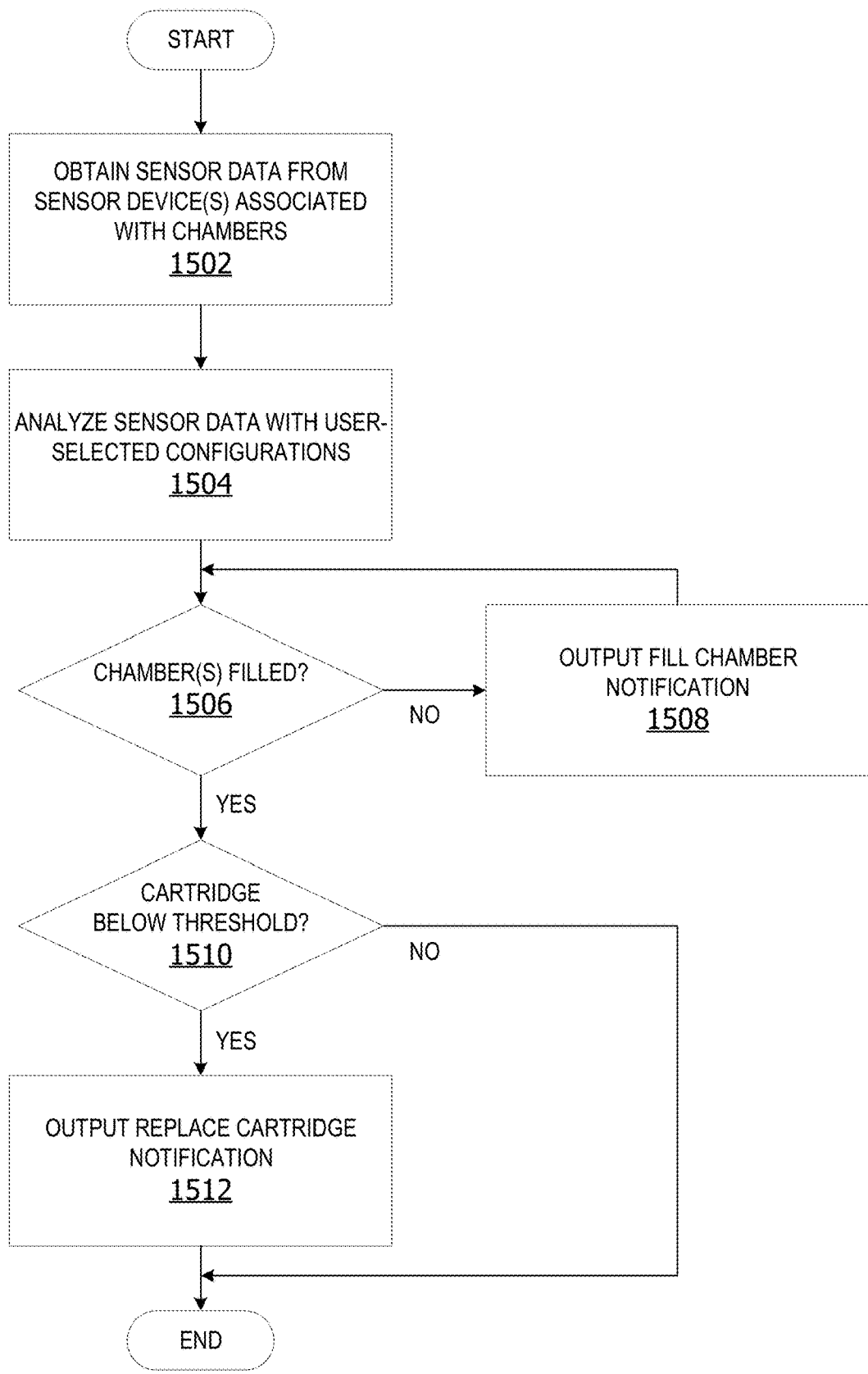
FIG. 15 is an exemplary flow chart illustrating operation of the computing device to monitor conditions within fruit ripening chambers and output maintenance notifications to a user based on detected conditions.

FIG. 15 is an exemplary flow chart illustrating operation of the computing device to monitor conditions within fruit ripening chambers and output maintenance notifications to a user based on detected conditions. The process shown in FIG. 15 can be performed by a controller component, executing on a processor within a fruit ripening rack, such as the fruit ripening rack 102 or the user device 126 in FIG. 1.

The process begins by obtaining sensor data from sensor device(s) associated with chambers at 1502. The sensor data includes data, such as, but not limited to, the sensor data 134 in FIG. 1. The controller component analyzes sensor data with user-selected configurations at 1504. The controller component determines if the chambers are filled at 1506. If no, the controller component outputs a fill chamber notification at 1508. When the chamber is filled, the controller component determines if the ethylene gas cartridge is below a threshold level at 1510. The controller component outputs a replace cartridge notification at 1512. The process terminates thereafter.

While the operations illustrated in FIG. 15 are performed by a fruit ripening device, aspects of the disclosure contemplate performance of the operations by other entities. For example, a cloud service can perform one or more of the operations.

Figure 16:
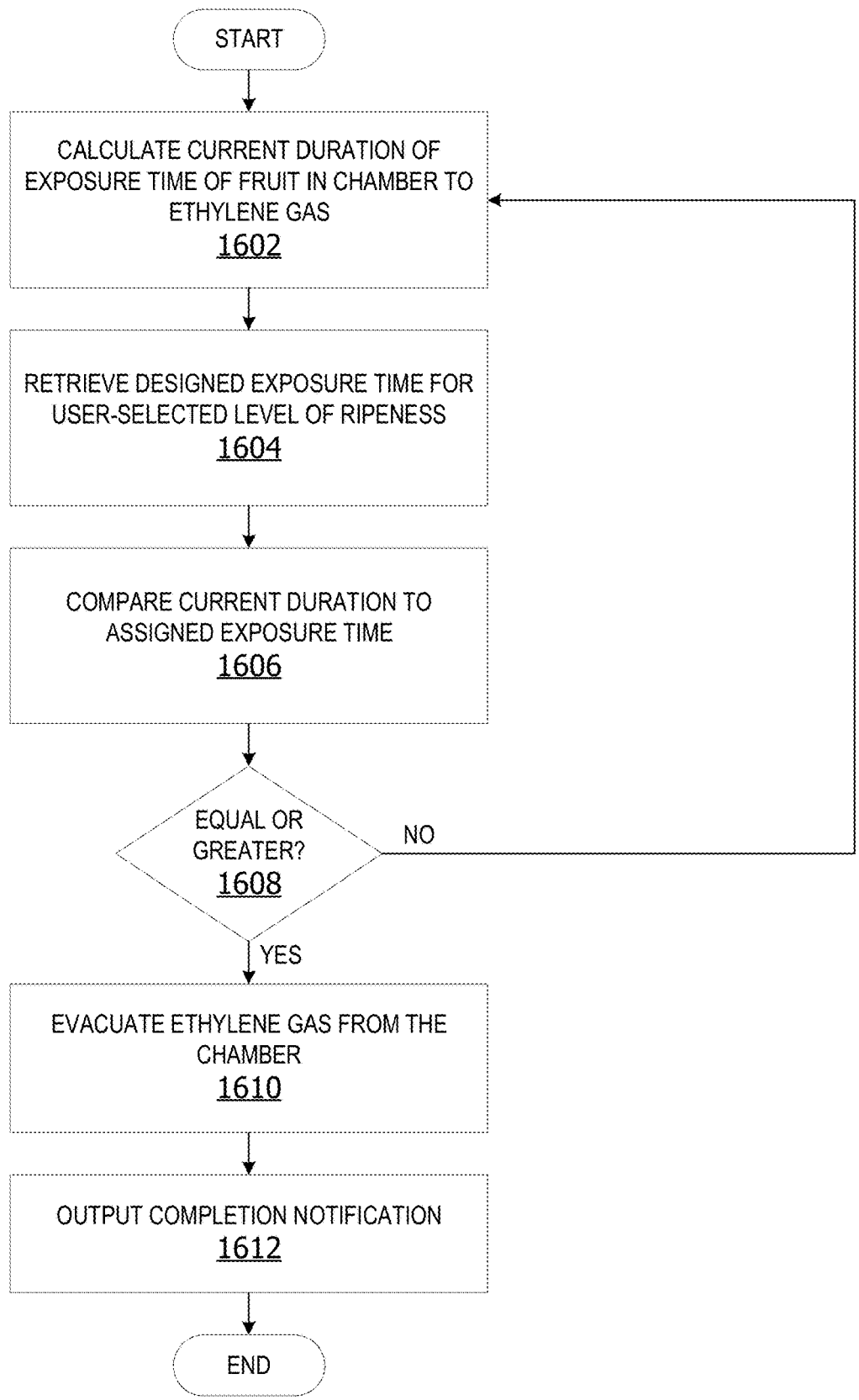
FIG. 16 is an exemplary flow chart illustrating operation of the computing device to increase or decrease ethylene gas content within each chamber to control ripening.

FIG. 16 is an exemplary flow chart illustrating operation of the computing device to increase or decrease ethylene gas content within each chamber to control ripening. The process shown in FIG. 16 can be performed by a controller component, executing on a processor within a fruit ripening device, such as the fruit ripening rack 102 or the user device 126 in FIG. 1.

The process begins by calculating current duration of exposure time of fruit in chamber to ethylene gas at 1602. The controller component retrieves exposure time for user-selected level of ripeness at 1604. The controller component compares the current duration to the assigned exposure time at 1606. The controller component determines if the current duration is greater than or equal to assigned exposure time at 1606. If yes, the controller component evacuates ethylene gas from the chamber at 1610. The controller component outputs a completion notification at 1612. The process terminates thereafter.

While the operations illustrated in FIG. 16 are performed by a fruit ripening device, aspects of the disclosure contemplate performance of the operations by other entities. For example, a cloud service can perform one or more of the operations.

ADDITIONAL EXAMPLES

In some examples, a device for case-level banana-ripening in a store is provided. The device controls ethylene exposure on unripe or partially unripe produce within one or more chambers of the device. The system includes a manifold supplied by a master supply of ethylene gas. The manifold valves at each location of a case allows produce within a selected case to be exposed to a predetermined amount of ethylene gas for a predetermined time-period calculated to ripen the produce to a desired level at a desired future time. An evacuation system recycles and adjusts the gas quantity in the case.

In some examples, the system provides a device for ripening produce via ethylene gas exposure within a store customized based on per-store transaction data and/or local events on a per-day basis and per-store selected level of ripeness. This moves the point of exposure closer to the point of sale/point of exposure to reduce waste due to over-ripening prior to sale. The device further enables individual stores to tailor/customize quantities of fruit ripened per-day to meet current sales volume while keeping additional stock in a pre-ripe state.

In some examples, the device includes a manifold supplied by a master supply of ethylene gas with valves at each location of a case of produce that allows for a predetermined amount of ethylene gas exposure to begin the ripening of a selected case of produce while remaining produce in other chambers remain unexposed to ethylene gas. In other words, the device includes air-tight chambers or other means of keeping the ethylene gas in one chamber from contacting produce in other chambers unintentionally.

In an example scenario, bananas and other produce are harvested and shipped in an un-ripe (pre-ripe) state to a store or other retail location. Crates of the unripe fruit are placed into one or more chambers within a fruit ripening rack. A user selects per-chamber configurations for ripening the fruit in each chamber. The crates of fruit in each chamber are exposed to configurable levels of ethylene gas to initiate the naturally occurring chemical ripening process. The fruit ripening rack also provides varying temperature and humidity levels within each chamber to ripen the fruit in each chamber at variable rates. This configurable per-chamber fruit ripening provides fruit ripened to different configurable levels of ripeness.

The fruit ripening rack further provides varying quantities of fruit for sale/consumption on different days based on predicted future demand (sales) for each type of fruit. In this manner, fruit is ripened on-site, at each store, based on predicted demand to prevent/mitigate over-ripening of fruit prior to sale and reduce loss due to discarded over-ripe fruit.

In other examples, the fruit ripening rack is used in-store to expose unripe produce to ethylene gas on a smaller scale. This moves the point of exposure closer to the point of consumption to reduce overall waste by customizing quantities of ripening produce to meet current sales volume while keeping additional produce stock at the same location in an unripe (pre-ripe) state. The fruit ripening rack further enables fine-tuning quantities of fruit ripened for sale/consumption on a daily basis.

In another example, when unripe fruit arrives at a store location, only a portion of the unripe fruit is ripened within the fruit ripening rack. The remainder of the unripe fruit is stored in a pre-ripe state. The portion of the unripe fruit placed into the fruit ripening rack is ripened to various levels of ripeness. In other words, some of the fruit is fully ripened while another portion of the fruit is ripened to a lesser ripe state (yellow with some green). This provides fruit ripened to various levels to suit the preferences of multiple different customers.

In an example, a manifold (metering device) with valves at each location of a chamber containing produce regulates/provides metered volumetric flow of ethylene gas into each chamber. The manifold allows the correct amount of ethylene exposure to begin the ripening within a selected chamber only. When the exposure time has elapsed, the ethylene gas is ventilated (removed) from the chamber without exposing produce in other chambers to the gas.

Another example provides case-level banana ripening via a fruit ripening rack. The system controls ethylene gas exposure on produce at a store-level. A metering device controls the flow of gas from a master supply of ethylene gas, such as, without limitation, an ethylene gas cartridge. The metering device (manifold) includes a valve stopping or permitting flow of gas into each chamber to control produce exposure. The system includes an evacuation system to recycle and adjust gas quantity within each chamber to accelerate or inhibit fruit ripening on a per-chamber basis.

The ethylene gas cartridge in some examples is a disposable cartridge which is replaced by the user when the supply of gas within the cartridge is empty. The ethylene gas cartridge can be made of plastic, metal, a combination of plastic and metal, or any other suitable material. In one non-limiting example, the ethylene gas cartridge diameter varies from 0.25 to 3.0 inches. In another non-limiting example, the in-store ethylene gas cartridge is six inches diameter by six-inch-long cylindrical shaped container. However, the examples are not limited to these measurements. The ethylene gas cartridge can be a bottle, bag, cartridge, or any other type of container having any dimensions suitable for storing a quantity of ethylene gas.

The fruit ripening rack can optionally include a water source, such as a water cartridge, water line, or other water supply. The water source supplies water for regulating humidity levels within one or more chambers.

The fruit ripening rack optionally includes a speaker or other output device for generating an alert. The alert can be output when the ethylene gas cartridge is empty or the amount of gas in the cartridge is below a minimum threshold level.

The controller component in other examples dynamically recalculates temperature and/or humidity levels within a selected chamber which will ripen fruit to a selected ripeness level on an updated (changed) completion date after ripening within the chamber (initial gas exposure) has already occurred. For example, if fruit is set to be ripened in three days, but the user changes the date to four days, the controller adjusts conditions within the chamber to slow ripening dynamically during the ripening process. In another example, if the user changes the ripening time from three days to two days, the controller component adjusts the temperature and/or humidity levels within the chamber to accelerate ripening such that the fruit within the chamber will be ripened to the selected level a day earlier than originally planned. This can occur due to changes in predicted demand or occurrence of an unexpected event driving demand for produce up or down.

Alternatively, or in addition to the other examples described herein, examples include any combination of the following:

the calculation component, implemented on the at least one processor, calculates a first temperature and a first humidity level to complete ripening of the first quantity of fruit in the first chamber to a selected level of ripeness on the first selected date;

the calculation component, implemented on the at least one processor, calculates a second temperature and a second humidity level to complete ripening of the first quantity of fruit in the first chamber to a selected level of ripeness on the first selected date;

a thermostat, implemented on the at least one processor, adjusts an internal temperature and humidity level inside the first chamber to match the calculated first temperature and first humidity level;

the thermostat, implemented on the at least one processor, adjusts an internal temperature and humidity level inside the second chamber to match the calculated second temperature and second humidity level;

a user interface device, implemented on the at least one processor, receives a user selection of a first ripeness level associated with the first chamber and a second ripeness level associated with fruit in the second chamber, wherein the quantity of fruit in the first chamber is ripened to the first ripeness level and the quantity of the fruit in the second chamber is ripened to the second ripeness level, wherein the first ripeness level is a different level of ripeness than the second ripeness level;
a communications interface component, implemented on the at least one processor, that receives a user selection of a first ripeness level associated with the first chamber and a second ripeness level associated with fruit in the second chamber from a remote computing device via a network, wherein the quantity of fruit in the first chamber is ripened to the first ripeness level and the quantity of the fruit in the second chamber is ripened to the second ripeness level, wherein the first ripeness level is a different level of ripeness than the second ripeness level;
wherein the fruit ripening rack is a stand-alone device including a cooling device and a heating element for regulating an internal temperature of each chamber in the plurality of chambers;
wherein the fruit ripening rack is incorporated into a refrigeration storage device;
the calculation component, implemented on the at least one processor, calculates a third quantity of ethylene gas and a third exposure time to complete ripening of a third quantity of fruit in a third chamber to a first level of ripeness on a third selected date;
the calculation component, implemented on the at least one processor, calculates a fourth quantity of ethylene gas and a fourth exposure time to complete ripening of a fourth quantity of fruit in a fourth chamber to a first level of ripeness on a third selected date;
the controller component, implemented on the at least one processor, releases the third quantity of ethylene gas into the third chamber for the third exposure time;
the controller component, implemented on the at least one processor, releases the fourth quantity of ethylene gas into the fourth chamber for the fourth exposure time, wherein the fruit in the third chamber is ripened to the first level of ripeness and the fruit in the fourth chamber is ripened to the second level of ripeness, wherein the first level of ripeness is a different level of ripeness than the second level ripeness;
a notification component, implemented on the at least one processor, outputs a refill chamber notification to a user device on condition the sensor data indicates at least one chamber in the plurality of chamber is empty, the refill chamber notification comprising an instruction to refill the at least one empty chamber;
releasing configurable quantities of ethylene gas into each chamber in the plurality of chambers to stagger ripening of fruit in each chamber such that at least one case of fruit in one chamber achieves a user-selected level of ripeness on each day of a week;
analyzing, by a monitoring component, sensor data generated by a set of sensor devices within the plurality of chambers;
generating, by a notification component, a notification indicating the at least one case of fruit in the first chamber has reached the first level of ripeness on condition a result of the analysis of the sensor data confirms the level of ripeness has been achieved;
calculating a first temperature and a first humidity level to complete ripening of a first case of fruit in the first chamber to the selected level of ripeness on the first selected date;
calculating, by the calculation component, a second temperature and a second humidity level to complete ripening of a second case of fruit second chamber to the selected level of ripeness on the second selected date;
adjusting, by a thermostat, an internal temperature and humidity level inside the first chamber to match the calculated first temperature and first humidity level;
adjusting, by the thermostat, an internal temperature and humidity level inside the second chamber to match the calculated second temperature and second humidity level;
calculating a third quantity of ethylene gas and a third exposure time to complete ripening of a third quantity of fruit in a third chamber to a first level of ripeness on a third selected date;
calculating a fourth quantity of ethylene gas and a fourth exposure time to complete ripening of a fourth quantity of fruit in a fourth chamber to a first level of ripeness on a third selected date;
releasing the third quantity of ethylene gas into the third chamber for the third exposure time;
releasing the fourth quantity of ethylene gas into the fourth chamber for the fourth exposure time;
wherein the fruit in the third chamber is ripened to the first level of ripeness and the fruit in the fourth chamber is ripened to the second level of ripeness;
wherein the first level of ripeness is a different level of ripeness than the second level ripeness;
receiving, by the controller component, an updated set of per-chamber fruit ripening configurations including an updated ripeness level;
activating, by the controller component, the ethylene gas metering device or a gas evacuation device to alter a quantity of ethylene gas in the at least one chamber of the fruit ripening rack to accelerate ripening of the fruit in the at least one chamber or delay ripening of the fruit in the at least one chamber to achieve the updated level of ripeness on the scheduled completion date;
a light emitting diode (LED) display device that outputs a refill chamber notification to notify at least one user to perform maintenance or repair on condition sensor data indicates an absence of fruit in a selected chamber;
the set of sensor devices comprising at least one of a set of ethylene gas detectors, a set of image capture devices, a set of weight sensors, a set of pressure sensors, a set of humidity sensors, or a set of temperature sensors; and
an ethylene gas generator, the ethylene gas generator converts ethyl alcohol into ethylene gas for release into at least one chamber of the configurable fruit ripening device.

At least a portion of the functionality of the various elements in FIG. 1, FIG. 2, FIG. 3, FIG. 4, FIG. 5, FIG. 6, FIG. 7, FIG. 8, FIG. 9, and FIG. 10 can be performed by other elements in FIG. 1, FIG. 2, FIG. 3, FIG. 4, FIG. 5, FIG. 6, FIG. 7, FIG. 8, FIG. 9, and FIG. 10, or an entity (e.g., processor 112, web service, server, application program, computing device, etc.) not shown in FIG. 1, FIG. 2, FIG. 3, FIG. 4, FIG. 5, FIG. 6, FIG. 7, FIG. 8, FIG. 9, and FIG. 10.

In some examples, the operations illustrated in FIG. 13, FIG. 14, FIG. 15 and FIG. 16 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for customized fruit ripening at a retail location via a fruit ripening rack. For example, the elements illustrated in FIG. 1, FIG. 2, FIG. 3, FIG. 4, FIG. 5, FIG. 6, FIG. 7, FIG. 8, FIG. 9, and FIG. 10, such as when encoded to perform the operations illustrated in FIG. 13, FIG. 14, FIG. 15 and FIG. 16, constitute exemplary means for analyzing historical transaction data associated with a selected location and seasonal demand data using pattern recognition to generate a predicted demand for a selected type of fruit on a first selected date and a predicted demand for the selected type of fruit on a second selected date at the selected location; exemplary means for calculating a first quantity of fruit to satisfy the predicted demand on the first selected date and a second quantity of fruit to satisfy the predicted demand on the second selected date; exemplary means for sending an instruction to at least one user to load the first quantity of unripe fruit into a first chamber of a fruit ripening rack and load the second quantity of the fruit into a second chamber of the fruit ripening rack; exemplary means for calculating a first quantity of ethylene gas and a first exposure time to complete ripening of the first quantity of fruit in the first chamber to a selected level of ripeness on the first selected date; exemplary means for calculating a second quantity of ethylene gas and a second exposure time to complete ripening of the second quantity of fruit in the second chamber to the selected level of ripeness on the second selected date; exemplary means for releasing the first quantity of ethylene gas into the first chamber for the first exposure time; and exemplary means for releasing the second quantity of ethylene gas into the second chamber for the second exposure time.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for dynamic customization of fruit ripening, the system comprising:
    a fruit ripening rack comprising a plurality of chambers configured to store at least one crate of unripe fruit, the plurality of chambers comprising a first chamber and a second chamber;
    a set of ethylene gas supply lines connecting an ethylene gas metering device to each of the plurality of chambers, each ethylene gas supply line of the set of ethylene gas supply lines connecting the ethylene gas metering device to an individual chamber of the plurality of chambers;
    a control device comprising a memory and at least one processor communicatively coupled to the memory;
    an analysis component, implemented on the at least one processor, analyzes historical transaction data and seasonal demand data associated with a selected location using pattern recognition;
    a prediction component, implemented on the at least one processor:
        generates a first predicted demand for a selected type of fruit on a first selected date and a second predicted demand for the selected type of fruit on a second selected date; and
        calculates a first quantity of fruit to satisfy the first predicted demand on the first selected date and a second quantity of the fruit to satisfy the second predicted demand on the second selected date;
    a communications interface component, implemented on the at least one processor, that receives a user selection of a first ripeness level associated with the fruit in the first chamber and a second ripeness level associated with the fruit in the second chamber from a remote computing device via a network, wherein the fruit in the first chamber is ripened to the first ripeness level and the fruit in the second chamber is ripened to the second ripeness level, wherein the first ripeness level is a different level of ripeness than the second ripeness level; and
    a calculation component, implemented on the at least one processor, that calculates:
        a first quantity of ethylene gas to be released from the ethylene gas metering device and a first exposure time of the first quantity of the fruit to the first quantity of released ethylene gas to complete ripening of the first quantity of fruit in the first chamber to the selected first ripeness level on the first selected date; and
        a second quantity of ethylene gas to be released from the ethylene gas metering device and a second exposure time of the second quantity of the fruit to the second quantity of released ethylene gas to complete ripening of the second quantity of fruit in the second chamber to the selected second ripeness level on the second selected date; and
    a controller component, implemented on the at least one processor, that activates the ethylene gas metering device to release the first quantity of ethylene gas into the first chamber for the first exposure time based on the selected first ripeness level on condition the first quantity of fruit is present within the first chamber and release the second quantity of ethylene gas into the second chamber for the second exposure time based on the selected second ripeness level on condition the second quantity of fruit is present within the second chamber.

2. The system of claim 1, wherein:
the calculation component further calculates a first temperature and a first humidity level to complete ripening of the first quantity of the fruit in the first chamber to a first level of ripeness on the first selected date; and
the system further comprises a thermostat, implemented on the at least one processor, that adjusts an internal temperature and humidity level inside the first chamber to match the first temperature and the first humidity level.

3. The system of claim 2, wherein:
the calculation component further calculates a second temperature and a second humidity level to complete ripening of the second quantity of the fruit in the second chamber to a second level of ripeness on the second selected date; and
the thermostat further adjusts an internal temperature and humidity level inside the second chamber to match the second temperature and the second humidity level.

4. The system of claim 1, further comprising:
a user interface device, implemented on the at least one processor, receives a user selection of a first ripeness level associated with the first chamber and a second ripeness level associated with fruit in the second chamber, wherein the first quantity of the fruit in the first chamber is ripened to the first ripeness level and the second quantity of the fruit in the second chamber is ripened to the second ripeness level, wherein the first ripeness level is a different level of ripeness than the second ripeness level.

5. The system of claim 1, wherein the fruit ripening rack is a stand-alone device including a cooling device and a heating element for regulating an internal temperature of each chamber in the plurality of chambers.

6. The system of claim 1, wherein the fruit ripening rack is incorporated into a refrigeration storage device.

7. The system of claim 1, wherein:
the calculation component further:
    calculates a third quantity of ethylene gas to be released from the ethylene gas metering device and a third exposure time of a third quantity of the fruit to the third quantity of released ethylene gas to complete ripening of the third quantity of the fruit in a third chamber to a first level of ripeness on a third selected date;
    calculates a fourth quantity of ethylene gas to be released from the ethylene gas metering device and a fourth exposure time of a fourth quantity of the fruit to the fourth quantity of released ethylene gas to complete ripening of the fourth quantity of the fruit in a fourth chamber to the first level of ripeness on the third selected date; and the controller component further:
controls the ethylene gas metering device to release the third quantity of ethylene gas into the third chamber for the third exposure time; and
controls the ethylene gas metering device to release the fourth quantity of ethylene gas into the fourth chamber for the fourth exposure time,
wherein the fruit in the third chamber is ripened to the first level of ripeness, the fruit in the fourth chamber is ripened to a second level of ripeness, and the first level of ripeness is a different level of ripeness than the second level of ripeness.

8. The system of claim 1, further comprising:
a notification component, implemented on the at least one processor, outputs:
a refill chamber notification to a user device on condition at least one chamber in the plurality of chambers is empty, the refill chamber notification comprising an instruction to refill the at least one chamber, and
a ripening complete notification to the user device indicating the fruit in the at least one chamber has reached a selected level of ripeness.

9. A customized fruit ripening rack, the customized fruit ripening rack comprising:
a plurality of chambers for ripening at least one case of unripe fruit, a case of unripe fruit comprising fruit unexposed to ethylene gas, the plurality of chambers comprising a first chamber and a second chamber;
a set of ethylene gas supply lines connecting an ethylene gas metering device to each of the plurality of chambers, each ethylene gas supply line of the set of ethylene gas supply lines connecting the ethylene gas metering device to an individual chamber of the plurality of chambers;
a control device comprising a memory and at least one processor communicatively coupled to the memory;
a user interface device comprising a set of configuration controls, the user interface device receives a set of per-chamber fruit ripening configurations for customizing ripening of the fruit in each chamber in the plurality of chambers via the set of configuration controls, the set of per-chamber fruit ripening configurations comprising a per-chamber level of ripeness and a per-chamber date of completion;
generating, by a set of sensor devices associated with each chamber in the plurality of chambers, sensor data associated with contents of each chamber;
analyzing, by an analysis component, the sensor data to identify a first quantity of the fruit in a first chamber and a second quantity of the fruit in a second chamber in the plurality of chambers;
a communications interface component, implemented on the at least one processor, that receives a user selection of a first ripeness level associated with the fruit in the first chamber and a second ripeness level associated with the fruit in the second chamber from a remote computing device via a network, wherein the fruit in the first chamber is ripened to the first ripeness level and the fruit in the second chamber is ripened to the second ripeness level, wherein the first ripeness level is a different level of ripeness than the second ripeness level;
a calculation component, implemented on the at least one processor, that calculates:
a first quantity of ethylene gas to be released from the ethylene gas metering device and a first exposure time of the first quantity of the fruit to the first quantity of released ethylene gas to complete ripening of the first quantity of the fruit in the first chamber to the selected first ripeness level on a first selected date; and
a second quantity of ethylene gas to be released from the ethylene gas metering device and a second exposure time of the second quantity of the fruit to the second quantity of released ethylene gas to complete ripening of the second quantity of the fruit in the second chamber to the selected second ripeness level on a second selected date; and
a controller component, implemented on the at least one processor, that activates the ethylene gas metering device to release the first quantity of ethylene gas into the first chamber for the first exposure time based on the selected first ripeness level and release the second quantity of ethylene gas into the second chamber for the second exposure time based on the selected second ripeness level.

10. The customized fruit ripening rack of claim 9, further comprising:
a light emitting diode (LED) display device that outputs a refill chamber notification to notify at least one user to perform maintenance or repair on condition the sensor data indicates an absence of fruit in a selected chamber.

11. The customized fruit ripening rack of claim 9, the set of sensor devices further comprising at least one of a set of ethylene gas detectors, a set of image capture devices, a set of weight sensors, a set of pressure sensors, a set of humidity sensors, or a set of temperature sensors.

12. The customized fruit ripening rack of claim 9, further comprising:
an ethylene gas generator, the ethylene gas generator converts ethyl alcohol into ethylene gas for release into at least one chamber of the configurable fruit ripening device.

13. A computer-implemented method for dynamic customization of fruit ripening, the computer-implemented method comprising:
providing a fruit ripening rack comprising a plurality of chambers configured to store at least one crate of unripe fruit, the plurality of chambers comprising a first chamber and a second chamber;
providing a set of ethylene gas supply lines connecting an ethylene gas metering device to each of the plurality of chambers, each ethylene gas supply line of the set of ethylene gas supply lines connecting the ethylene gas metering device to an individual chamber of the plurality of chambers;
analyzing, by an analysis component implemented on a processor, historical transaction data and seasonal demand data associated with a selected location using pattern recognition;
generating, by a prediction component implemented on the processor, a first predicted demand for a selected type of fruit on a first selected date and a second predicted demand for the selected type of fruit on a second selected date;
calculating, by the prediction component, a first quantity of fruit to satisfy the first predicted demand on the first selected date and a second quantity of fruit to satisfy the second predicted demand on the second selected date;
receiving, by a communication interface component implemented on the processor, a user selection of a first ripeness level associated with the fruit in the first chamber and a second ripeness level associated with the fruit in the second chamber from a remote computing device via a network, wherein the fruit in the first chamber is ripened to the first ripeness level and the fruit in the second chamber is ripened to the second ripeness level, wherein the first ripeness level is a different level of ripeness than the second ripeness level;

calculating, by a calculation component implemented on the processor, a first quantity of ethylene gas to be released from the ethylene gas metering device and a first exposure time of the first quantity of fruit to the first quantity of released ethylene gas to complete ripening of the first quantity of fruit in the first chamber of the plurality of chambers to the selected first ripeness level on the first selected date;

calculating, by the calculation component, a second quantity of ethylene gas to be released from the ethylene gas metering device and a second exposure time of the second quantity of fruit to the second quantity of released ethylene gas to complete ripening of the second quantity of fruit in the second chamber to the selected second ripeness level on the second selected date;

activating, by a controller implemented on the processor, the ethylene gas metering device to release the first quantity of ethylene gas into the first chamber for the first exposure time based on the selected first ripeness level and release the second quantity of ethylene gas into the second chamber for the second exposure time based on the selected second ripeness level.

14. The method of claim 13, further comprising:
calculating, by the calculation component, a first temperature and a first humidity level to complete ripening of the first quantity of fruit in the first chamber to a first level of ripeness on the first selected date; and
adjusting, by a thermostat, an internal temperature and humidity level inside the first chamber to match the first temperature and the first humidity level.

15. The method of claim 14, further comprising:
calculating, by the calculation component, a second temperature and a second humidity level to complete ripening of the second quantity of fruit in the second chamber to a second level of ripeness on the second selected date; and
adjusting, via the thermostat, an internal temperature and humidity level inside the second chamber to match the second temperature and the second humidity level.

16. The method of claim 13, further comprising regulating an internal temperature of each chamber in the plurality of chambers.

17. The method of claim 13, further comprising:
calculating, by the calculation component, a third quantity of ethylene gas to be released from the ethylene gas metering device and a third exposure time of a third quantity of fruit to the third quantity of released ethylene gas to complete ripening of the third quantity of fruit in a third chamber to a first level of ripeness on a third selected date;
calculating, by the calculation component, a fourth quantity of ethylene gas to be released from the ethylene gas metering device and a fourth exposure time of a fourth quantity of fruit to the fourth quantity of released ethylene gas to complete ripening of the fourth quantity of fruit in a fourth chamber to the first level of ripeness on the third selected date;
releasing, by the ethylene gas metering device, the third quantity of ethylene gas into the third chamber for the third exposure time; and
releasing, by the ethylene gas metering device, the fourth quantity of ethylene gas into the fourth chamber for the fourth exposure time.

18. The method of claim 17, wherein the fruit in the third chamber is ripened to the first level of ripeness, the fruit in the fourth chamber is ripened to a second level of ripeness, and the first level of ripeness is a different level of ripeness than the second level of ripeness.

* * * * *